(12) United States Patent
Isozaki et al.

(10) Patent No.: US 11,360,680 B2
(45) Date of Patent: Jun. 14, 2022

(54) STORAGE DEVICE

(71) Applicant: Kioxia Corporation, Tokyo (JP)

(72) Inventors: Hiroshi Isozaki, Kanagawa (JP); Teruji Yamakawa, Tokyo (JP)

(73) Assignee: Kioxia Corporation, Tokyo (JP)

( * ) Notice: Subject to any disclaimer, the term of this patent is extended or adjusted under 35 U.S.C. 154(b) by 231 days.

(21) Appl. No.: 15/921,196

(22) Filed: Mar. 14, 2018

(65) Prior Publication Data

US 2019/0087113 A1    Mar. 21, 2019

(30) Foreign Application Priority Data

Sep. 21, 2017  (JP) .............................. JP2017-181632

(51) Int. Cl.
*G06F 3/06* (2006.01)

(52) U.S. Cl.
CPC ............ *G06F 3/0637* (2013.01); *G06F 3/067* (2013.01); *G06F 3/0622* (2013.01); *G06F 3/0626* (2013.01); *G06F 3/0652* (2013.01); *G06F 3/0659* (2013.01); *G06F 3/0673* (2013.01)

(58) Field of Classification Search
CPC .......... G06F 2212/7205; G06F 3/0626; G06F 3/0659; G06F 3/067; G06F 3/0637; G06F 3/0673; G06F 3/0652; G06F 3/0622; G06F 3/06
See application file for complete search history.

(56) References Cited

U.S. PATENT DOCUMENTS

| | | | |
|---|---|---|---|
| 9,633,738 B1 * | 4/2017 | Guo | G11C 16/10 |
| 9,990,382 B1 * | 6/2018 | Dias | G06F 16/215 |
| 10,146,782 B1 * | 12/2018 | Bono | G06F 16/162 |
| 10,620,855 B2 * | 4/2020 | Marripudi | G06F 21/31 |
| 2004/0114265 A1 | 6/2004 | Talbert | |
| 2004/0268073 A1 * | 12/2004 | Morisawa | G06F 21/80 |
| | | | 711/164 |
| 2007/0185815 A1 * | 8/2007 | Boccon-Gibod | H04L 9/3242 |
| | | | 705/51 |
| 2007/0266259 A1 | 11/2007 | Utsumi | |
| 2008/0155680 A1 | 6/2008 | Guyot et al. | |
| 2008/0201544 A1 * | 8/2008 | Nakajima | G06F 3/061 |
| | | | 711/166 |

(Continued)

FOREIGN PATENT DOCUMENTS

| | | | |
|---|---|---|---|
| JP | 2003330806 | * 11/2003 | ............ G06F 12/14 |
| JP | 2006-344177 A | 12/2006 | |

(Continued)

OTHER PUBLICATIONS

R. Thibadeau, "Trusted Computing for Disk Drives and Other Peripherals," in IEEE Security & Privacy, vol. 4, No. 5, pp. 26-33, Sep.-Oct. 2006.*

(Continued)

*Primary Examiner* — Pierre Michel Bataille
(74) *Attorney, Agent, or Firm* — Allen & Overy LLP

(57) ABSTRACT

According to one embodiment, a storage device is configured to store unencrypted user data. The user data is erased according to at least one data erasure mechanism. The storage device comprises a receiver configured to receive an inquiry from a host device, and a transmitter configured to transfer response information indicating the at least one data erasure mechanism to the host device.

14 Claims, 23 Drawing Sheets

(56) References Cited

U.S. PATENT DOCUMENTS

| | | | |
|---|---|---|---|
| 2009/0006500 A1* | 1/2009 | Shiozawa | G06F 11/1662 |
| 2009/0049253 A1* | 2/2009 | Shibata | G11C 16/22 |
| | | | 711/154 |
| 2011/0238901 A1* | 9/2011 | Koga | G06F 21/602 |
| | | | 711/103 |
| 2013/0246281 A1* | 9/2013 | Yamada | H04L 9/3231 |
| | | | 705/71 |
| 2014/0006465 A1* | 1/2014 | Davis | G06F 16/183 |
| | | | 707/827 |
| 2015/0347291 A1 | 3/2015 | Choi et al. | |
| 2015/0121537 A1* | 4/2015 | Ellis | G06F 21/60 |
| | | | 726/26 |
| 2015/0143134 A1* | 5/2015 | Hashimoto | G06F 21/6209 |
| | | | 713/193 |
| 2016/0313943 A1* | 10/2016 | Hashimoto | G06F 3/0659 |
| 2017/0131917 A1 | 5/2017 | Yun et al. | |
| 2018/0067671 A1* | 3/2018 | Marripudi | G06F 21/31 |
| 2018/0074766 A1* | 3/2018 | Yokomizo | G06F 3/1285 |
| 2018/0373651 A1* | 12/2018 | Kurafuji | G06F 9/4812 |
| 2019/0146931 A1* | 5/2019 | Frolikov | G06F 3/0631 |
| | | | 713/193 |

FOREIGN PATENT DOCUMENTS

| | | |
|---|---|---|
| JP | 2007-328765 A | 12/2007 |
| JP | 2008-159059 A | 7/2008 |
| JP | 2011-14103 A | 1/2011 |
| JP | 2014-174862 A | 9/2014 |
| JP | 6056567 B2 | 1/2017 |
| KR | 1990-0014993 | 10/1990 |
| KR | 10-2015-0138528 A | 10/2015 |
| KR | 10-2017-0054633 A | 5/2017 |

OTHER PUBLICATIONS

Stuart Jacobs, "Security Systems Engineering," in Engineering Information Security: The Application of Systems Engineering Concepts to Achieve Information Assurance, IEEE, 2011, ch5, pp. 167-247.*

John Geldman, "Sanitize Command" T13/e07197r1, (Revision 1), Jun. 10, 2008, pp. 1-9.

"NVM Express" (Revision 1.3), May 1, 2017, pp. 1-282. http://www.nvmexpress.org/wp-content/uploads/NVM_Express_Revision_1.3.pdf.

"TCG Storage—Security Subsystem Class: Opal" (Specification Version 2.01, Revision 1.00), Aug. 5, 2015, pp. 1-72. https://trustedcomputinggroup.org/wp-content/uploads/TCG_Storage-Opal_SSC_v2.01_rev_1.00.pdf.

"TCG Storage—Security Subsystem Class; Pyrite" (Specification Version 1.00, Revision 1.00), Aug. 5, 2015, pp. 1-56. https://trustedcomputinggroup.org/wp-content/uploads/TCG_Storage-Pyrite_SSC_v1.00_rl.00.pdf.

Curtis E. Stevens, "Working Draft—American National Standard" Project—T13/BSR INCITS 529, (Revision 14), Oct. 14, 2016, pp. 1-632. http://www.t13.org/documents/UploadedDocuments/docs2016/di529r14-ATAATAPI_Command_Set_-_4.pdf.

Curtis E. Stevens (T13 Technical Editor), "Working Draft American National Standard," Project-T13/BSR INCITS 529, (Revision 18), Aug. 4, 2017, pp. 142-176, 226-242, 572.

* cited by examiner

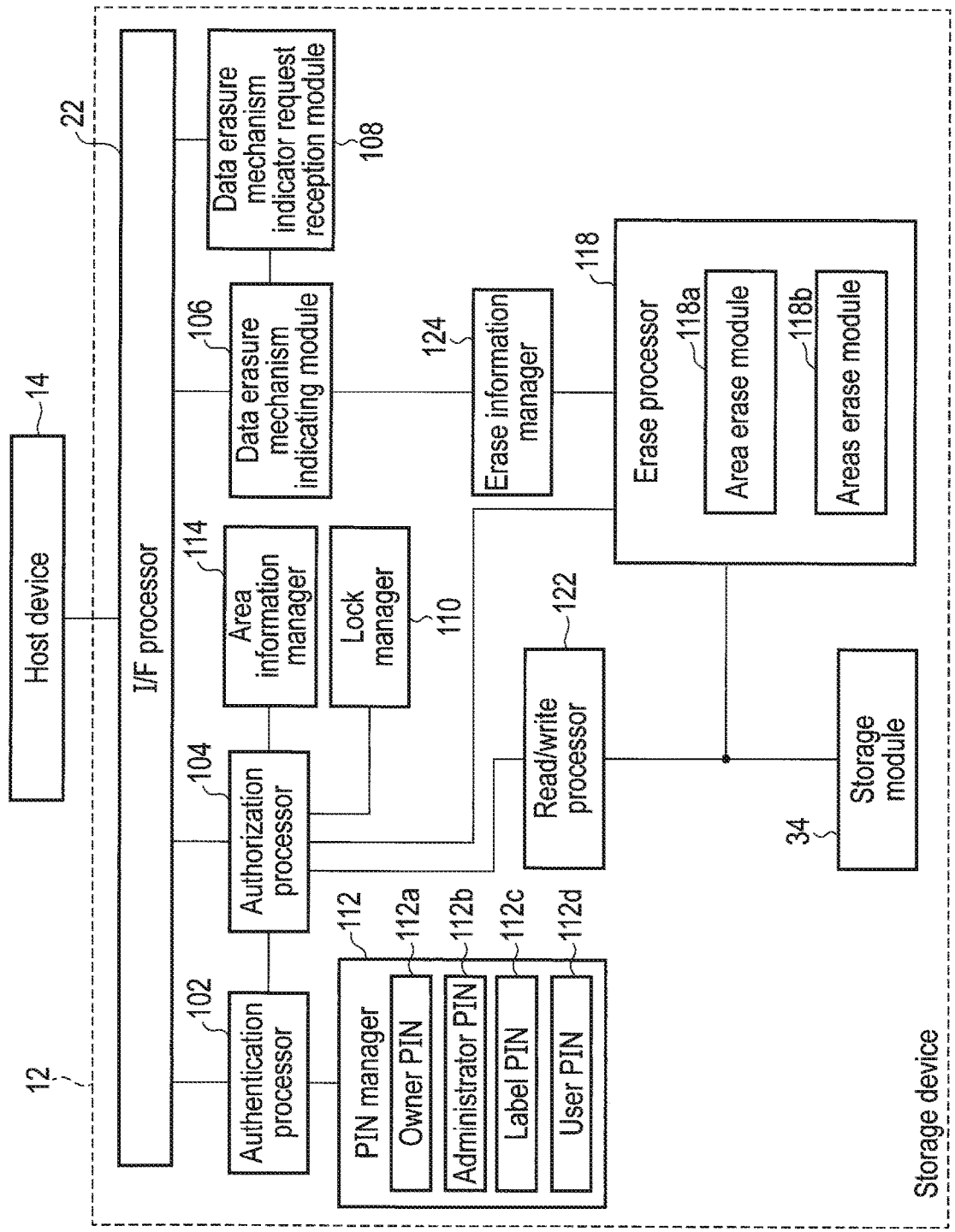
F I G. 2

| PIN | Command |
|---|---|
| Owner PIN (SID) | Activate/Revert |
| Administrator PIN (AdminPIN) | RevertSP |
| Label PIN (PSID) | Revert |
| User PIN | |

FIG. 3A

| Command | PINs to be initialized | Data Erasure |
|---|---|---|
| Activate | | |
| Revert | Owner PIN, Administrator PIN | YES (YES/NO is not selectable) |
| RevertSP | Administrator PIN | YES/NO is selectable |

FIG. 3B

| Label PIN | Data to be erased | PINs to be initialized |
|---|---|---|
| PSID 1 | All | Owner PIN, Administrator PIN |
| PSID 2 | Area allocated to user 1 | User PIN of user 1 |
| PSID 3 | Area allocated to user 2 | User PIN of user 2 |
| ... | ... | ... |

FIG. 3C

Level 0 Discovery Header

| Bit / Byte | 7 | 6 | 5 | 4 | 3 | 2 | 1 | 0 |
|---|---|---|---|---|---|---|---|---|
| 0-3 | \multicolumn{8}{c}{Length of Parameter Data} | | | | | | | |
| 4-7 | Data Structure Version | | | | | | | |
| 8-15 | Reserved | | | | | | | |
| 16-47 | Vendor Unique | | | | | | | |

F I G. 6A

Level 0 Discovery Response Data Format

| Bit / Byte | 7 | 6 | 5 | 4 | 3 | 2 | 1 | 0 |
|---|---|---|---|---|---|---|---|---|
| 0-47 | Level 0 Discovery Header | | | | | | | |
| 48-n | Feature Descriptor | | | | | | | |

F I G. 6B

Feature Descriptor Code

| Feature code | Feature name |
|---|---|
| ⋮ | ⋮ |
| 0004h | Data erasure mechanism |
| ⋮ | ⋮ |

FIG. 7A

Data erasure mechanism Feature Descriptor

| Byte \ Bit | 7 | 6 | 5 | 4 | 3 | 2 | 1 | 0 |
|---|---|---|---|---|---|---|---|---|
| 0 | MSB | Feature code (=0004h) | | | | | | |
| 1 | | | | | | | | LSB |
| 2 | Version | | | | Reserved | | | |
| 3 | Reserved | | | | | | | |
| 4 | Feature Descriptor data (Data erasure mechanism) | | | | | | | |
| 5-n | Reserved | | | | | | | |

FIG. 7B

| Bit | Feature Descriptor data (Data erasure mechanism) |
|---|---|
| 0 | Overwrite erasure |
| 1 | Block erasure |
| 2 | Unmap |
| 3 | Reset write pointers |
| 4 | Encryption key updating (crypto erasure) |
| 5 | Vendor Unique |
| 6-7 | Reserved |

FIG. 7C

| Range | LBA space | Lock/unlock flag |
|---|---|---|
| Range1 | LBA X-Y | Lock |
| Range2 | LBA Y-Z | Unlock |
| Range3 | LBA Z-XX | Lock |
| ... | ... | |
F I G. 8

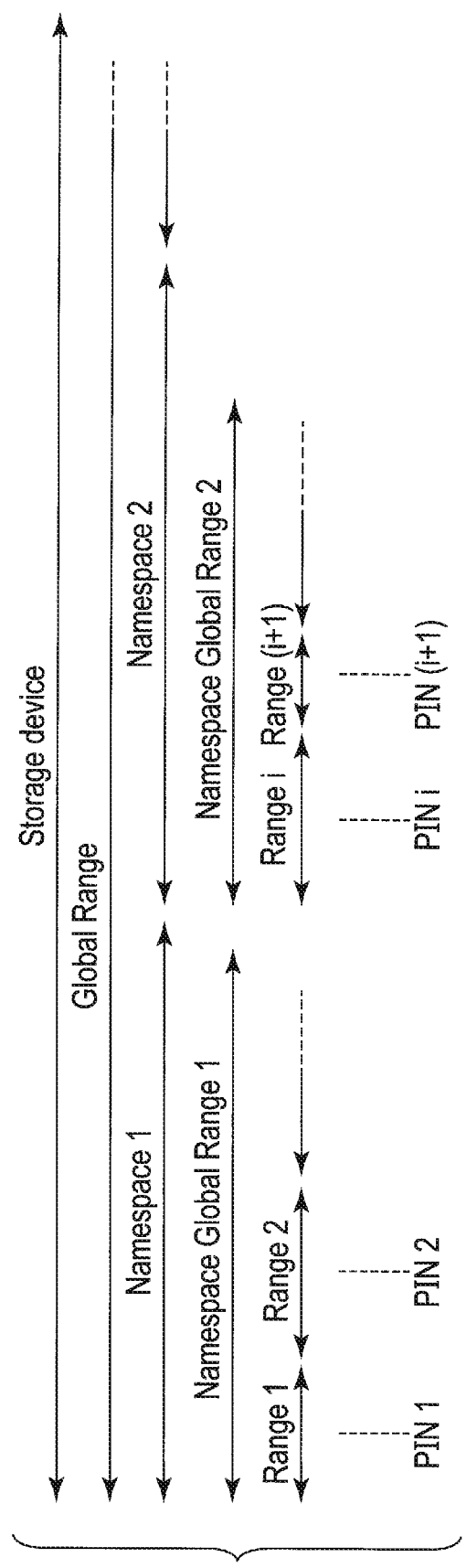
F I G. 13

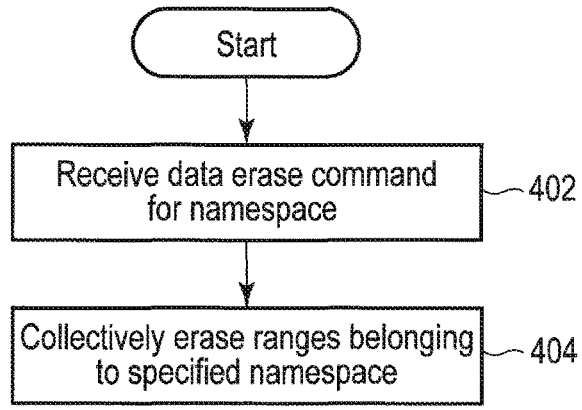
FIG. 14A
Namespace Table
| Namespace to be erased by Revert/RevertSP command | Namespace ID |
|---|---|
FIG. 14B
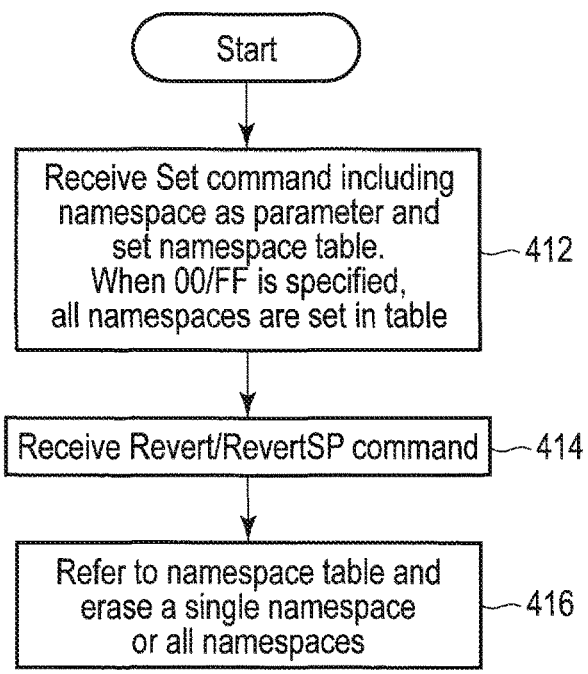
FIG. 14C

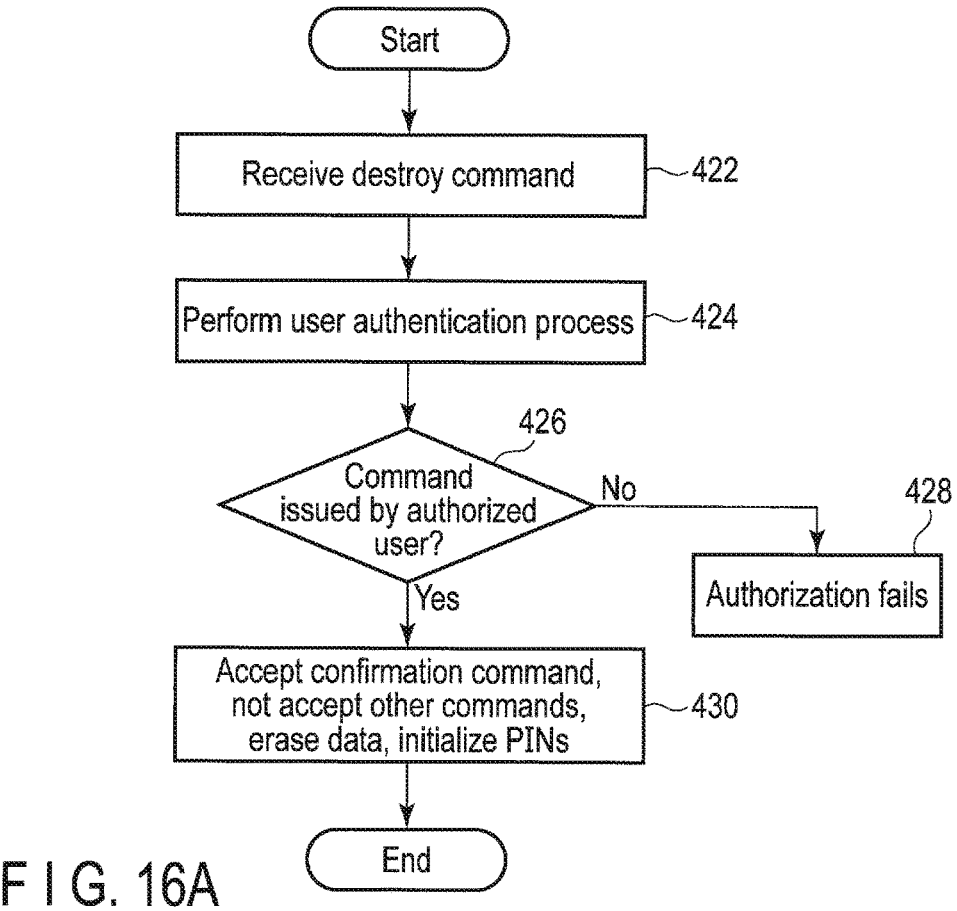
F I G. 16A
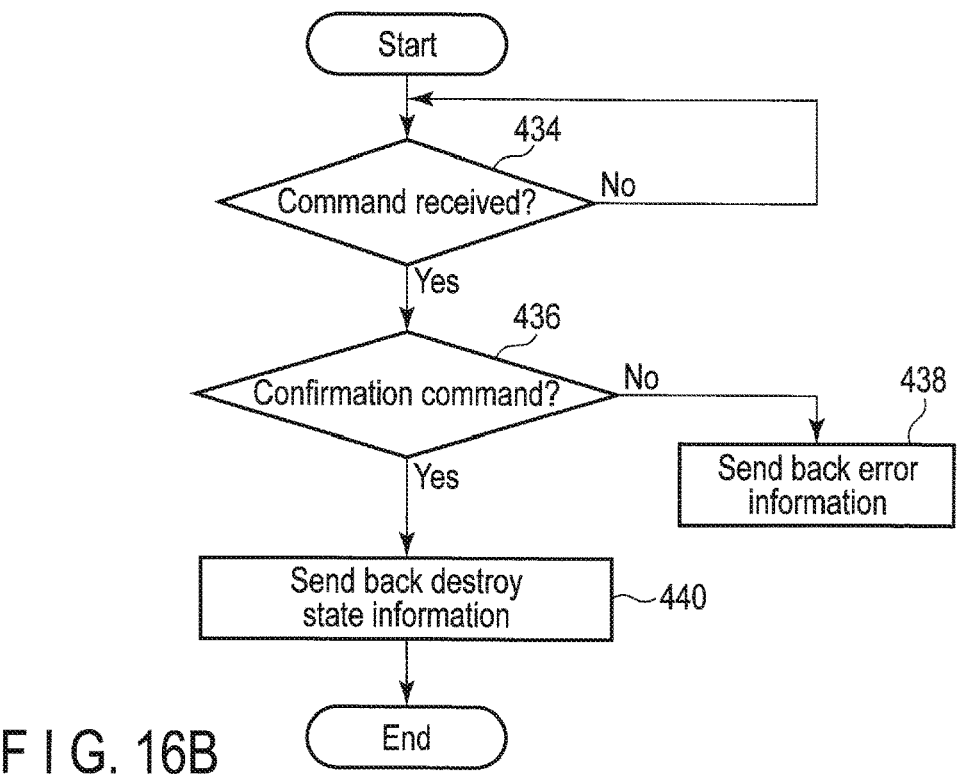
F I G. 16B

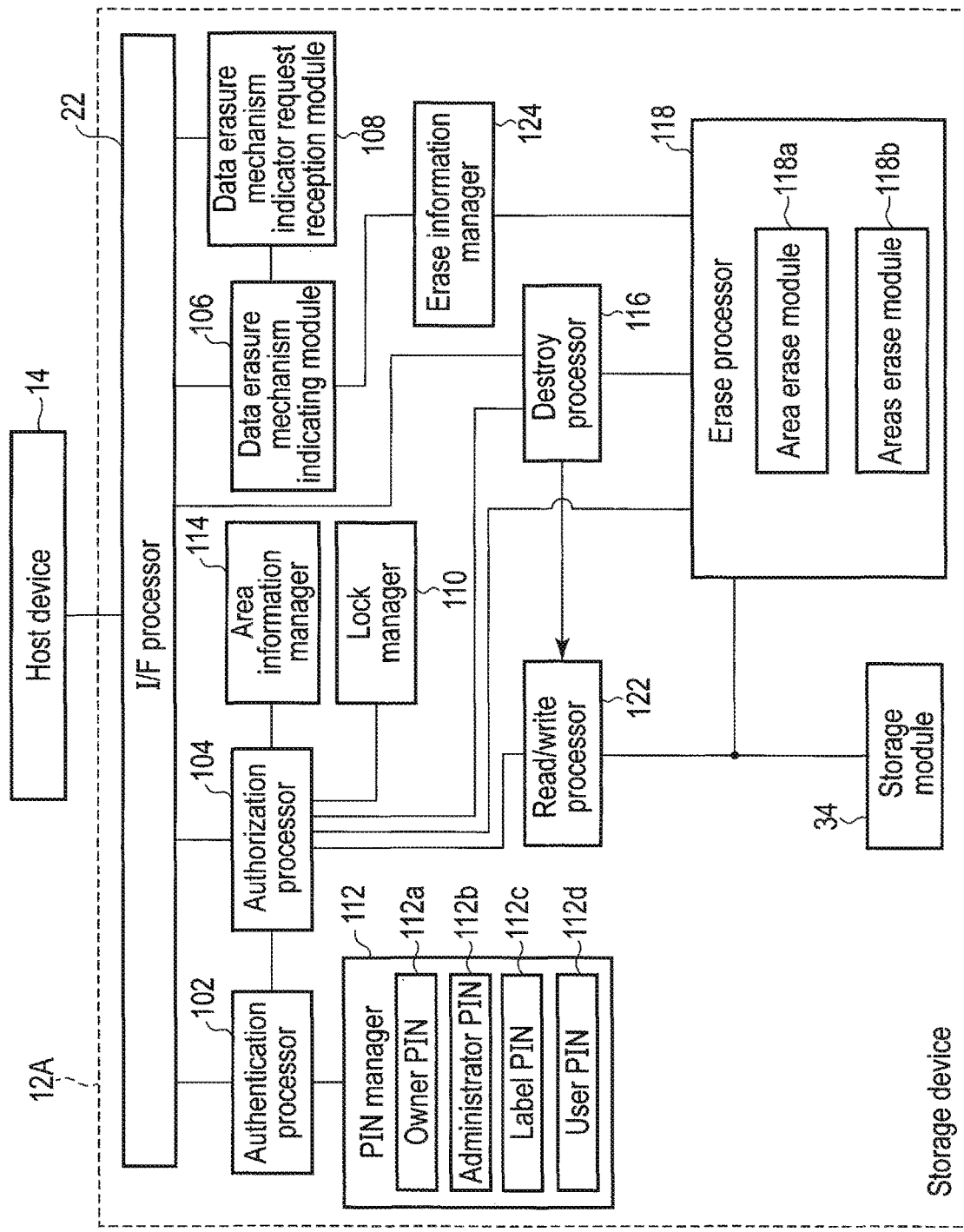
F I G. 17

112b

| PIN | Command | Target |
|---|---|---|
| Administrator PIN1 | Set | Administrator PIN1 |
| Administrator PIN2 | Set | Administrator PIN2 |
| Administrator PIN1 | Get | Administrator PIN1 |
| Administrator PIN2 | Get | Administrator PIN2 |

FIG. 21

| PIN | Command | Target |
|---|---|---|
| Anybody | Get | Label store table |
| Owner PIN (SID) | Set | Label store table |

FIG. 23

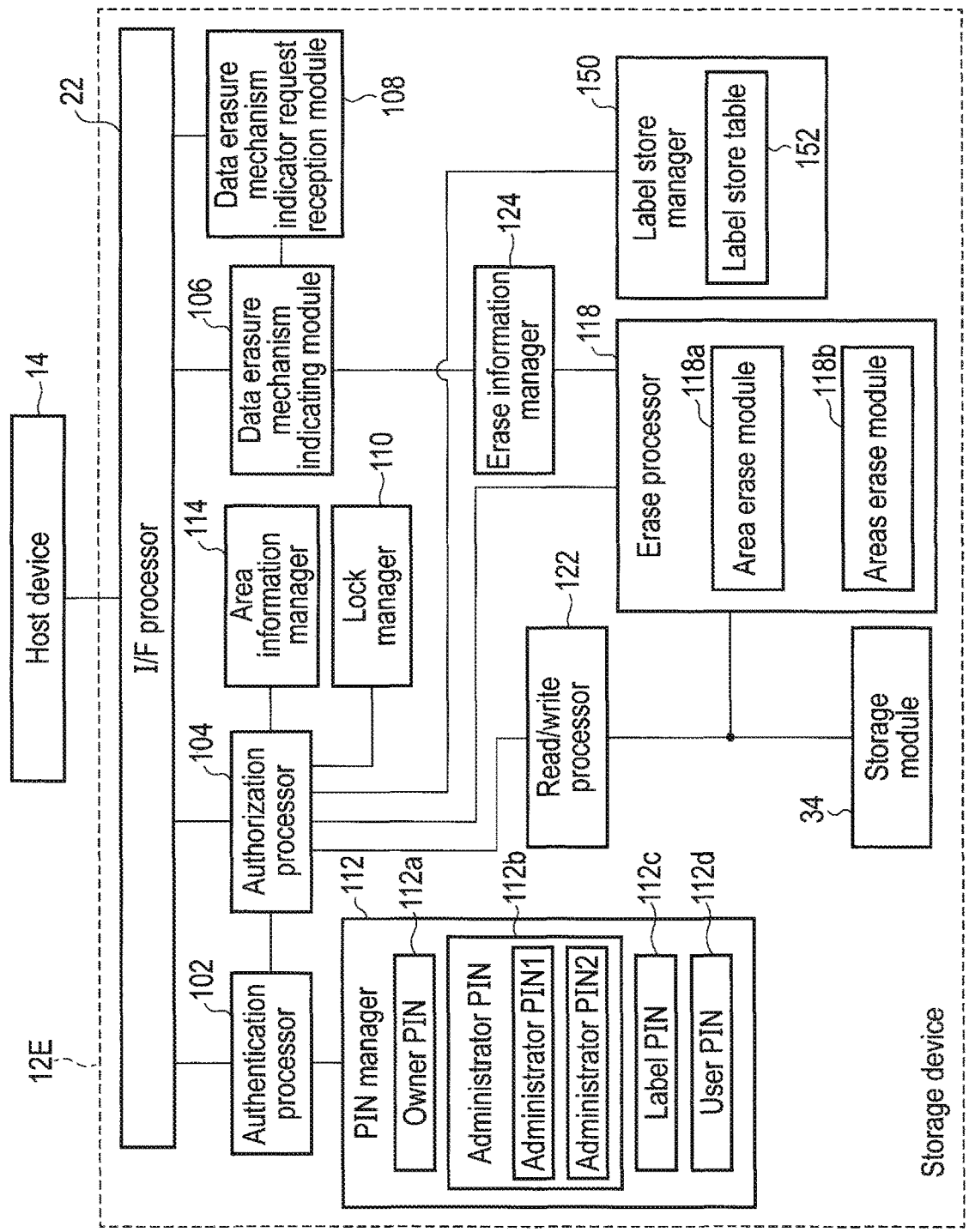
F I G. 22

STORAGE DEVICE

CROSS-REFERENCE TO RELATED APPLICATIONS

This application is based upon and claims the benefit of priority from Japanese Patent Application No. 2017-181632, filed Sep. 21, 2017, the entire contents of which are incorporated herein by reference.

FIELD

Embodiments described herein relate generally to a storage device.

BACKGROUND

Traditionally, security functions required for large-capacity storage devices have become diverse. An example of the security functions is to process data as needed.

BRIEF DESCRIPTION OF THE DRAWING

FIG. 2 shows an example of the configuration of the storage device according to the first embodiment.

FIGS. 3A, 3B, and 3C shows examples of PINs defined in the first embodiment.

FIG. 6A shows an example of a data erasure mechanism indicator request in the sequence shown in FIG. 5A and FIG. 5B.

FIG. 6B shows an example of a data erasure mechanism response in the sequence shown in FIG. 5A and FIG. 5B.

FIGS. 7A, 7B, and 7C show details of the data erasure mechanism response shown in FIG. 6B.

FIG. 8 shows an example in which access authority is set for each range.

FIG. 13 shows an example of the relationship between namespaces and ranges.

FIGS. 14A, 14B, and 14C are flowcharts showing an example of data erasing in namespace units.

FIG. 16A is a flowchart showing an example of destroying operation.

FIG. 16B is a flowchart showing an example of an operation of the storage device in the destroy state.

FIG. 17 shows an example of the configuration of a storage device according to a second embodiment.

FIG. 21 shows examples of Set Command and Get Command by Administrator PIN according to the fifth embodiment.

FIG. 22 shows an example of the configuration of a storage device according to a sixth embodiment.

FIG. 23 shows examples of the authority to issue Set Command and Get Command according to the sixth embodiment.

DETAILED DESCRIPTION

Embodiments will be described hereinafter with reference to the accompanying drawings. The following explanations disclose examples of devices and methods to embody the technical idea of the embodiments, and the technical idea of the embodiments is not limited to the structures, layout, etc., of the components explained below. Modification which is easily conceivable by a person of ordinary skill in the art comes within the scope of the disclosure as a matter of course. To make the description clearer, in a plurality of drawings, constituent elements comprising substantially the same function and structure are denoted by like reference numbers and their detailed descriptions may be omitted unless necessary.

In general, according to one embodiment, a storage device is configured to store unencrypted user data. The user data is erased according to at least one data erasure mechanism. The storage device includes a receiver configured to receive an inquiry from a host device, and a transmitter configured to transfer response information indicating the at least one data erasure mechanism to the host device.

First Embodiment

Figure 1A:
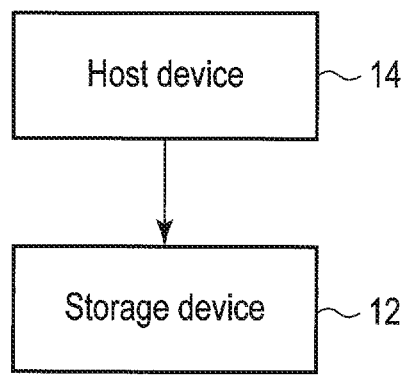
FIGS. 1A and 1B show examples of connection between a storage device and a host device according to a first embodiment.
Figure 1B:
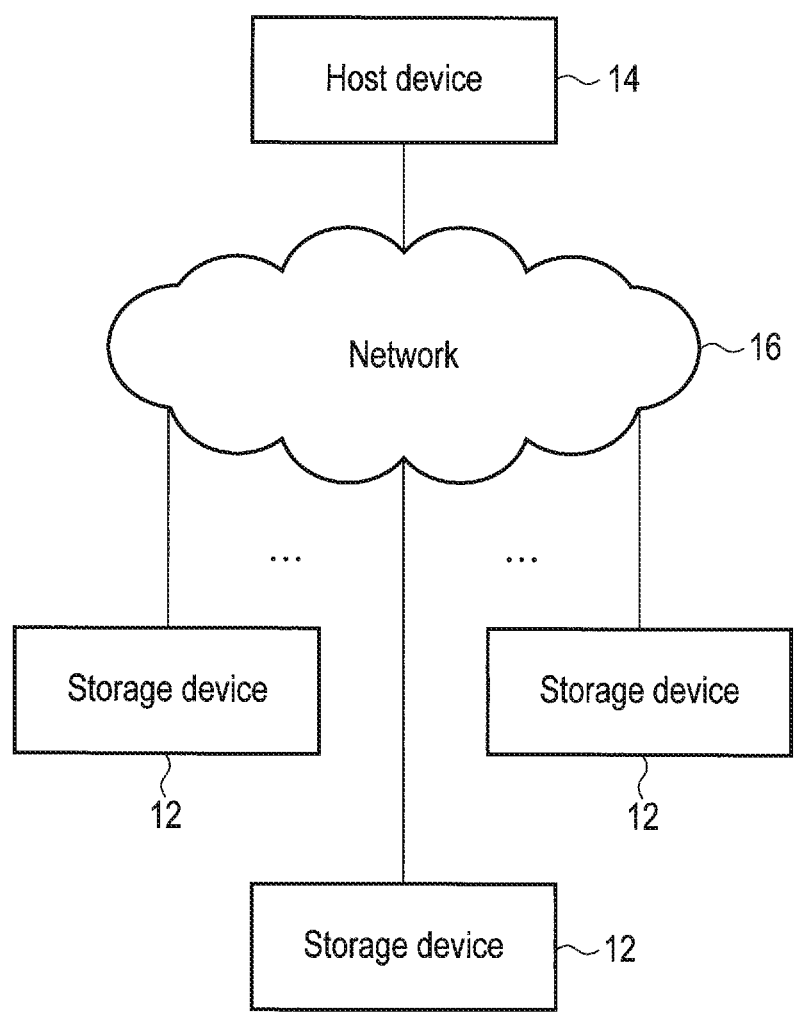

FIG. 1 shows examples of connection between a storage device 12 and a host device 14 according to a first embodiment. The storage device 12 is connected to the host device 14, and writes user data transferred storage device 12 or transfers user data read from the storage medium to the host device 14. The interface between the storage device 12 and the host device 14 is, for example, an SCSI (registered trademark), ATA (registered trademark), NVM Express (registered trademark) or an eMMC (registered trademark). A single storage device 12 may be connected to a single host device 14 in a one-to-one relationship as shown in FIG. 1A. Alternatively, a plurality of storage devices 12 may be connected to a single host device 14 via a network 16 as shown in FIG. 1B. The host device 14 may be an electronic device such as a personal computer (PC) in FIG. 1A. The host device 14 may be, for example, a server, in FIG. 1B. The storage device 12 shown in FIG. 1A may be installed in the PC by a PC vendor. The number of users of a single storage device 12 is not limited to one. A single storage device 12 may be used by a plurality of users. For example, as shown in FIG. 1B, when the host device 14 offers a service for providing a virtual machine to a large number of users, a single storage device 12 may be divided into a plurality of areas (for example, namespaces, ranges, or partitions) such that each area can be the virtual machine of a corresponding user.

[General Configuration]

FIG. 2 shows an example of the configuration of the storage device 12. The storage device 12 includes an interface (I/F) processor 22 which is connected to the host device 14 via a host I/F (not shown). An authentication processor 102, authorization processor 104, data erasure mechanism indicator module 106, and data erasure mechanism indicator request reception module 108 are connected to the I/F processor 22.

The authentication processor 102 performs user authentication process with a personal identification number (PIN) to control the access to the storage device 12. A PIN manager 112 is connected to the authentication processor 102. The PIN manager 112 manages a plurality of PINs, for example, Owner PIN (security identifier: SID) 112a, Administrator PIN (admin PIN) 112b, Label PIN (PSID) 112c, and User PIN 112d. To classify the authority into a hierarchy, Administrator PIN and User PIN are set.

The user may want to revert the storage device 12 to the shipping state for some reason. For example, when the storage device 12 is disposed, the user wants to prevent the leakage of the user data stored in a storage module 34 from the storage device 12. In this specification, the revert process of the storage device 12 to the shipping state is referred to as "reset." Reset includes both the erasure of user data (in other words, operation for preventing user data from being read) and the initialization of PINs set after shipping. Here, it is assumed that a specific PIN, for example, Owner PIN or Label PIN, is required for reset. Further, it is assumed that the storage device 12 includes a lock function, and a specific PIN is needed to lock the storage device 12 (in other words, to cause the storage device 12 to transition from an unlocked state to a locked state) or to unlock the storage device 12 (in other words, to cause the storage device 12 to transition from a locked state to an unlocked state).

The authentication processor 102, a lock manager 110, an area information manager 114, an erase processor 118, and a read/write processor 122 are connected to the authorization processor 104. When a command for reset is received from the host device 14, the authentication processor 102 performs user authentication process relating to a user who requests the command. Specifically, the authentication processor 102 checks whether or not the value of an input PIN matches the value of the PIN stored in the PIN manager 112. For example, when a request for authentication relating to the owner is received from the host device 14, the authentication processor 102 examines whether or not the value of the PIN included in the request for authentication matches the value of Owner PIN 112a stored in the PIN manager 114. When the values of PINs match, the authentication processor 102 determines that the authentication is successful. When the values of PINS do not match, the authentication processor 102 determines that the authentication fails. The authorization processor 104 determines whether or not the user who issues a command (in other words, the user of the host device 14) has the authority to issue the command. The authorization processor 104 notifies the lock manager 110, the read/write processor 122, the erase processor 118, etc., of the determination result. That is, the authorization processor 104 manages a table for determining which command can be executed by which execution authority. When a command is received, the authorization processor 104 determines whether or not the command can be executed by the command. For example, it is assumed that the table of the authorization processor 104 indicates that Revert command to reset the storage device 12 can be executed only when the authentication is successful with. Owner PIN or Label PIN. It is further assumed that the user who succeeded in authentication with Owner PIN issues Revert command to reset the storage device 12 from the host device 14. The authorization processor 104 determines whether or not the user who issues Revert command has the authority to issue Revert command. In this example, the execution of Revert command is permitted when authentication succeeds with Owner PIN. Thus, the authorization processor 104 determines that the user who issues Revert command has the authority. If the user who succeeded in authentication with User PIN tries to execute Revert command, the authorization processor 104 determines that the user who issues Revert command does not have the authority. When the authorization processor 104 determines that the user who issues Revert command has the authority, the authorization processor 104 transfers Revert command to the erase processor 118 to reset the storage device 12, causes the erase processor 118 to erase data, and resets the PINs so as to be initial values.

If the user who issues the unlock command is succeeded in authentication with User PIN or Administrator PIN, the authorization processor 104 transfers the unlock command to the lock manager 110. The lock manager 110 unlocks the storage device 12. The lock manager 110 may be configured to lock or unlock the entire user area of the storage module 34 managed by the area information manager 114. Alternatively, the lock manager 110 may be configured to lock or unlock a specific area of the storage module 34. Even if the user who issues the unlock command is succeeded in authentication with Label PIN issues, the authorization processor 104 does not transfer the unlock command to the lock manager 110. Thus, the storage device 12 is not unlocked.

The data erasure mechanism indicator request reception module 108 and an erase information manager 124 are connected to the data erasure mechanism indicating module 106. The data erasure mechanism indicator request reception module 108 receives an inquiry about data erasure mechanisms from the host device 14, and transfers it to the data erasure mechanism indicating module 106. The data erasure mechanism indicating module 106 shows the data erasure mechanisms supported by the storage device 12 to the host device 14.

For example, the data erasure mechanisms include overwrite data erasure, block erasure, unmap, reset write pointers and crypto erasure (encryption key updating). In overwrite data erasure, the area in which the data to be erased is stored is overwritten with "0" or data generated by random numbers. Block erasure disables the original written data of the entire block including the user data to be erased from being read. In unmap, a mapping table indicating in which block of the storage medium user data is stored is reset regarding the user data. In reset write pointers, a pointer indicating in which block of the storage medium user data is stored is reset. In crypto erasure, when input user data is encrypted with a key provided in the storage device 12, and the encrypted data is stored in the storage module 34, the key used for the data encryption is eradicated. In this way, the encrypted data cannot be decrypted, and thus, the input data is invalidated.

The erase information manager 124 is connected to the erase processor 118. The erase information manager 124 may not accept a read/write command while data is erased, manage the status of a data erasing process in preparation for power discontinuity while data is erased, and supply information indicating to what extent data has been erased to the host device 12 after restart at the time of power discontinuity. The erase processor 118 includes an area erase module 118a and areas erase module 118b. The erase processor 118 receives Revert command and RevertSP command which are for resetting the storage device 12 from the host device 14. The erase processor 118 erases the data in the storage module 34 by a particular data erasure mechanism according to information specifying data erasure mechanism and initializes PINs. Revert command and RevertSP command correspond to Revert method and RevertSP method defined in the specifications by "Trusted Computing Group", for example, "TOG Storage Security Subsystem Class: Pyrite", Specification Version 1.00, Revision 1.00, Aug. 5, 2015. The area erase module 118a erases data in a specified area of a memory space of the storage module 34. When data in an area of the storage area of the storage device 12 is erased, erasure of data in other areas may be suspended. The areas erase module 118b collectively erases data in plural areas. Examples of the plural areas include partitions assigned with the same Namespace ID.

The erase processor 218 and the read/write processor 122 are connected to the storage module 34. The storage module 34 includes a large-capacity nonvolatile storage medium such as a flash memory or a hard disk. The storage module 34 receives a read command or a write command from the host device 14, and writes or reads data.

Each part (module, processor, manager, etc.) of the storage device 12 can be implemented as software applications, hardware and/or software modules, or components on one or more computers or processors (CPUs). In the description, the module may be called the processor or the manager, the processor may be called the module or the manager, and the manager may be called the module or the processor.

[PIN]

PINs are described with reference to FIGS. 3A, 3B, and 3C. FIG. 3A shows commands which can be issued in accordance with the types of PINs. Owner PIN (SID) has the authority to issue Activate command and Revert command. The authorization processor 104 manages PINs and commands regarding which PIN is able to issue which command. Activate command is a command to enable the lock function. Revert command is a command to set PINs to the initial values, disable the lock function, and forcibly erase data. Administrator PIN (admin PIN) has the authority to issue RevertSP command. RevertSP command is a command to set PINs to the initial values and disable the lock function. With regard to forced data erasing, RevertSP command is able to specify with a parameter whether or not data should be erased. Label PIN (PSID) has the authority to issue Revert command. User PIN does not have the authority to issue Revert and RevertSP command. However, User PIN is able to unlock the area assign to the user.

FIG. 3B shows the types of PINs to be initialized and the types of data to be erased by commands. Activate command does not relate to reset. To the contrary, Activate command relates to activation. Neither the initialization of PINs nor data erasing is performed by Activate command. By Revert command, data is erased, and Owner PIN and Administrator PIN are initialized. By RevertSP command, data is erased, and Administrator PIN is initialized. RevertSP command is able to specify whether data should be erased or should be maintained without erasing with a parameter when the command is issued. Revert command does not include a parameter for specifying whether or not data should be erased. By Revert command, data is always erased.

In addition to the above commands, Set command to set PINs is provided. Set command includes a parameter indicating the type of PIN to be set. The authority to issue Set command varies depending on the value of the parameter, in other words, the type of PIN to be set. For example, Set command to set User PIN can be issued by the administrator and the user. The owner does not have the authority to set User PIN. Thus, Label PIN fails in authentication for Set command to set User PIN. The authority to issue Activate command, Revert command and RevertSP command is determined regardless of parameters.

According to first embodiment, two types of Label PINS (PSIDs) can be set. As shown in FIG. 3C, a first-type Label PIN (PSID1) is the above Label PIN to reset the storage device 14, and the data of the entire storage area is erased and Owner PIN and Administrator PIN are initialized by PSID 1. A second-type Label PIN is Label PIN (PSID 2, PSID 3, . . . ) for each user. It is assumed that the storage area is allocated to a plurality of users (here, user 1 and user 2). By Revert command issued by Label PIN (PSID 2) of user 1, the data of the area allocated to user 1 is erased, and User PIN of user 1 is initialized. By Revert command issued by Label PIN (PSID 3) of user 2, the data of the area allocated to user 2 is erased, and User PIN of user 2 is initialized. In other words, by Revert command issued by Label PIN (PSID 2) of user 1, the data of the area allocated to user 2 cannot be erased, and further, User PIN of user 2 cannot be initialized. By Revert command issued by Label PIN (PSID 3) of user 2, the data of the area allocated to user 1 cannot be erased, and further, the User PIN of user 1 cannot be initialized.

In this manner, security can be improved for each user.

Administrator PIN is able to reset the storage device 12 to the shipping state. However, in preparation for the loss of Administrator PIN, Label PIN for reset may be printed on somewhere on the storage device 12, for example, the name plate label attached to the chassis of the storage device. For example, when the storage area is allocated to a plurality of users 1 and user 2, PSID 1, PSID 2 and PSID 3 may be printed on the name plate label.

A method for notifying the PC vendor or the user of Label PIN without printing Label PIN on the storage device 12 may be employed. For example, the PC vendor may provide the user with a website such that Label PIN is displayed when the user inputs the serial number of the PC. Similarly, the vendor of the storage device may provide the user with a website such that Label PIN is displayed when the serial number of the storage device is input. As shown in FIG. 1B, in preparation for a case where a plurality of storage devices 12 are connected to the host device 14 such as a server, and the storage devices 12 in the server should be simultaneously reset, the vendor of the storage devices 12 may set Label PIN having the same value for the storage devices 12 and notify the server vendor of the value of Label PIN by e-mail, etc.

[State Transition of Storage Device]

Figure 4:
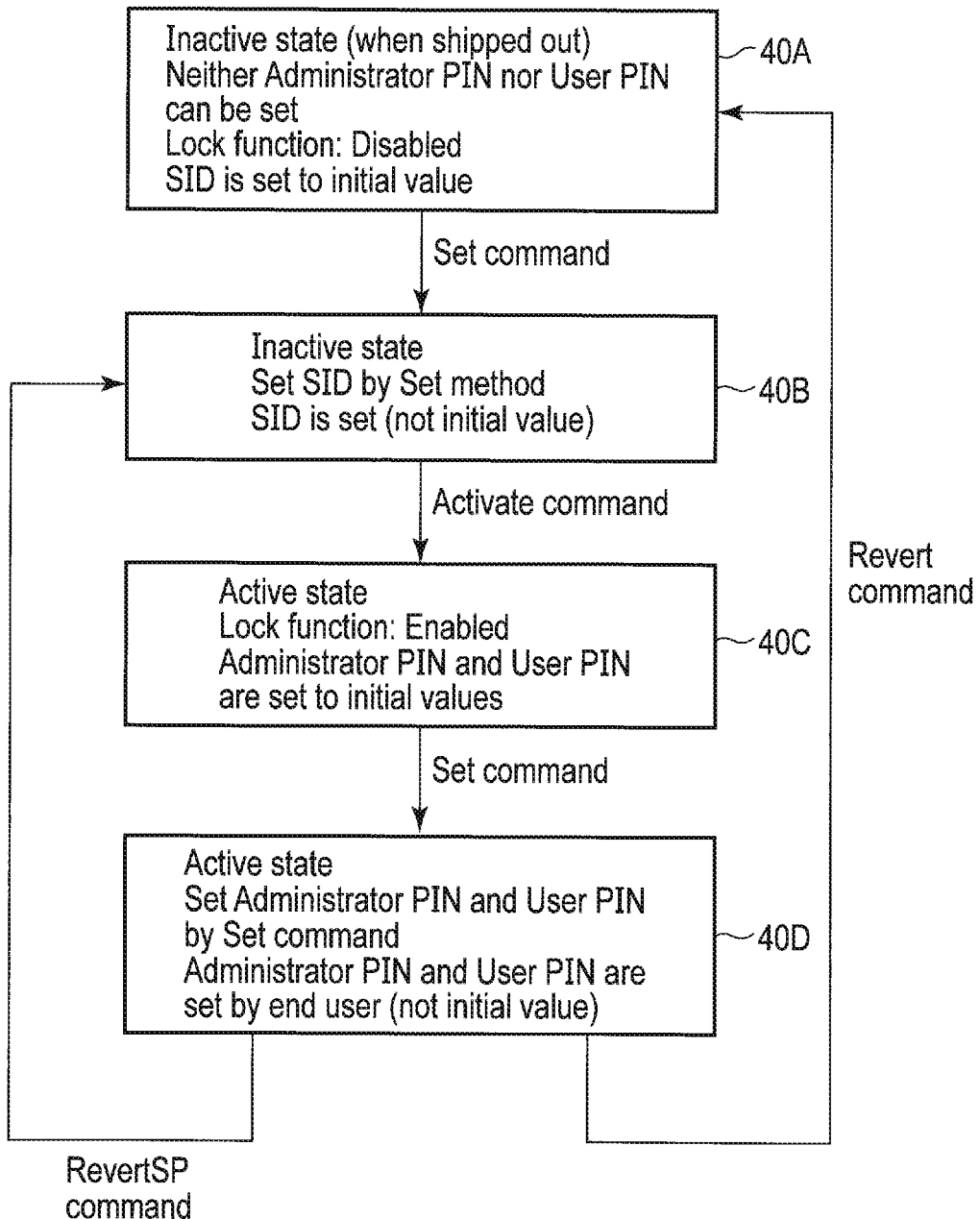
FIG. 4 shows an example of the state transition of the storage device.

FIG. 4 shows an example of the state transition of the storage device 12. When the storage device 12 is shipped out, the storage device 12 is in an inactive state 40A. In the inactive state 40A, neither Administrator PIN nor User PIN can be set, and the lock function is disabled. SID (Owner PIN) is set to an initial value. As the initial value of SID, MSID PIN may be defined. Anybody can obtain MSID PIN, using Get command. The method for notifying the user of the initial value of SID is not limited to the use of a command. The initial value of SID may be described in the manual or printed on the name plate label. When the storage device 12 is the same status as it is shipped out (the storage device 12 has not yet been configured), the host will authenticate as SID authority by using the initial value of SID, such as MSID PIN. Since the initial value of SID is MSID PIN, the authentication succeeds. Subsequently, SID can be changed to an arbitrary value (a desired PIN for the owner) from the initial value.

It is assumed that the storage device 12 is shipped to, for example, the PC vendor, in the inactive state 40A, and the PC vendor sets an SID by the above method. When the storage device 12 in the inactive state 40A receives Set command to set SID from the host device 14, the authority of the user who sends Set command is checked. Set command includes a parameter including SID to be set. The authority to set SID is the owner. When Set command is issued from the owner, SID is set. In an inactive state 40B, the value of SID is the value set by the owner with Set command (this value is not the initial value).

When the storage device 12 in the inactive state 40B receives Activate command from the host device 14, the authority of the user who sends Activate command is checked. Activate command is a command for causing the storage device 12 to transition to an active state. The authority to issue Activate command is the owner as shown in FIG. 3A. When the owner issues Activate command, the storage device 12 transitions to an active state 40C. In the active state 40C, Administrator PIN and User PIN are set to the initial values, and the lock function is enabled.

For example, it is assumed that the storage device 12 installed in a PC is shipped to the end user in the active state 40C, and Administrator PIN or User PIN is set on the end user side. When the storage device 12 in the active state 40C receives Set command to set Administrator PIN or Set command to set User PIN from the host device 14, the authority of the user who sends Set command is checked. Set command includes a parameter including Administrator PIN or User PIN to be set. The authority to set Administrator PIN is the administrator. The authority to set User PIN is the administrator and the owner. When Set command is issued from a user who has the authority to issue Set command, the value of Administrator PIN or User PIN is set to the value (this value is not the initial value) by the end user with Set command. Thus, the storage device 12 transitions to an active state 40D.

When the storage device 12 in the active state 40D receives Revert command to reset the storage device 12 from the host device 14, the authority of the user of issuance source of Revert command is checked. The authority to issue Revert command is a user who knows Owner PIN or Label PIN. When Revert command is issued by a user who has the authority to issue Revert command, data is erased, and Owner PIN, Administrator PIN and User PIN are initialized. Thus, the storage device 12 transitions to the inactive state (shipping state) 40A.

When the storage device 12 in the active state 40D receives RevertSP command to reset the storage device 12 from the host device 14, the authority of the user who sends RevertSP command is checked. The authority to issue RevertSP command is the administrator. When RevertSP command is issued by a user who has the authority to issue RevertSP command, data is erased, and Administrator PIN and User PIN are initialized. The storage device 12 transitions to the inactive state 40B. Even after the storage device 12 is reset by RevertSP command, the storage device 12 may remain in active state instead of inactive state.

When the PINS are initialized, the storage device 12 is automatically unlocked. As Owner PIN can be initialized by Revert command, the storage device 12 can be unlocked. However, data is erased by Revert command. Thus, after the storage device 12 is unlocked, the data stored by the user does not remain in the storage device 12.

Since Administrator PIN can be also initialized by RevertSP command, the storage device 12 can be unlocked. However, the storage device 12 can be unlocked by Administrator PIN without initializing Administrator PIN (without issuing RevertSP command). The lock manager 110 is provided with a flag for managing whether the storage device 12 is locked or not. The storage device 12 is locked when the flag it set and the storage device 12 is unlocked when the flag is reset. The flag can be set by Set command. Therefore, the storage device 12 can be unlocked without issuing RevertSP command. Authority to reset the flag is Administrator PIN. The erase information manager 114 is able to set the flag for a specific area (range) of a storage area. To unlock a range 1, the flag for the range 1 is reset. Authority to reset the flag for the range 1 is confirmed by using User PIN 1. A user who knows User PIN 1 is able to lock or unlock the range 1 but is unable to lock or unlock a range 2. Thus, the storage device 12 can be locked in range units.

Since Label PIN has an authority to issue Revert command in order for initialization, the storage device 12 can be unlocked. However, data is erased by Revert command. Thus, after the storage device 12 is unlocked, the data stored by the user does not remain.

When the storage device 12 receives Revert command, the storage device 12 erases data by an internal process and is also unlocked. Strictly speaking, one of data erasing and unlocking is performed, and subsequently, the other is performed. In consideration of security at the time of power discontinuity, unlocking should be preferably performed after data erasing. When power discontinuity occurs after unlocking and immediately before data erasing, the storage device 12 may be unlocked without erasing data. However, when measures are taken to prevent such a situation at the time of power discontinuity, data erasing may be performed after unlocking.

[Sequence of Data Erasing]

Figure 5A:
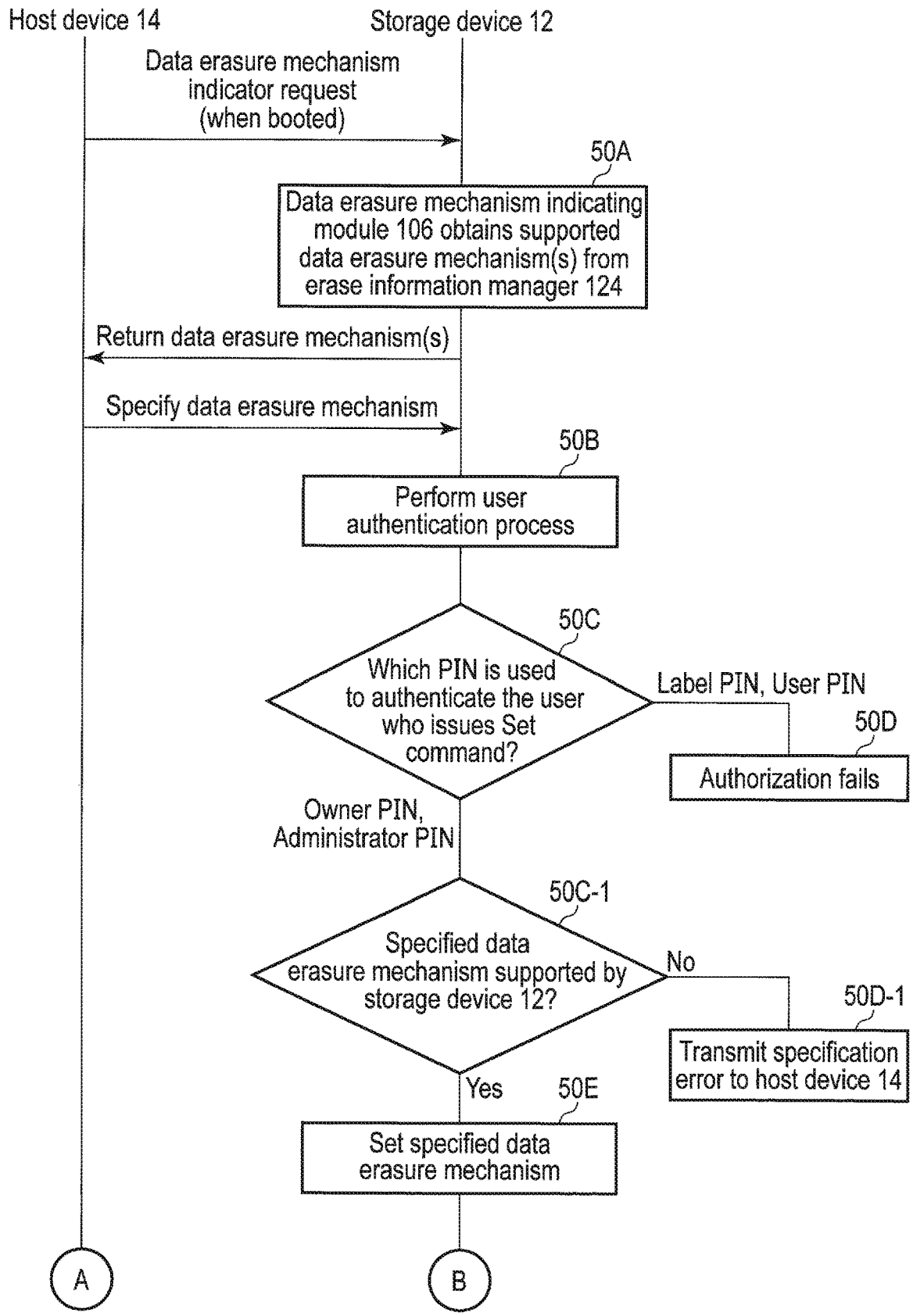
FIGS. 5A and 5B show an example of a sequence of data erasing according to the first embodiment.
Figure 5B:
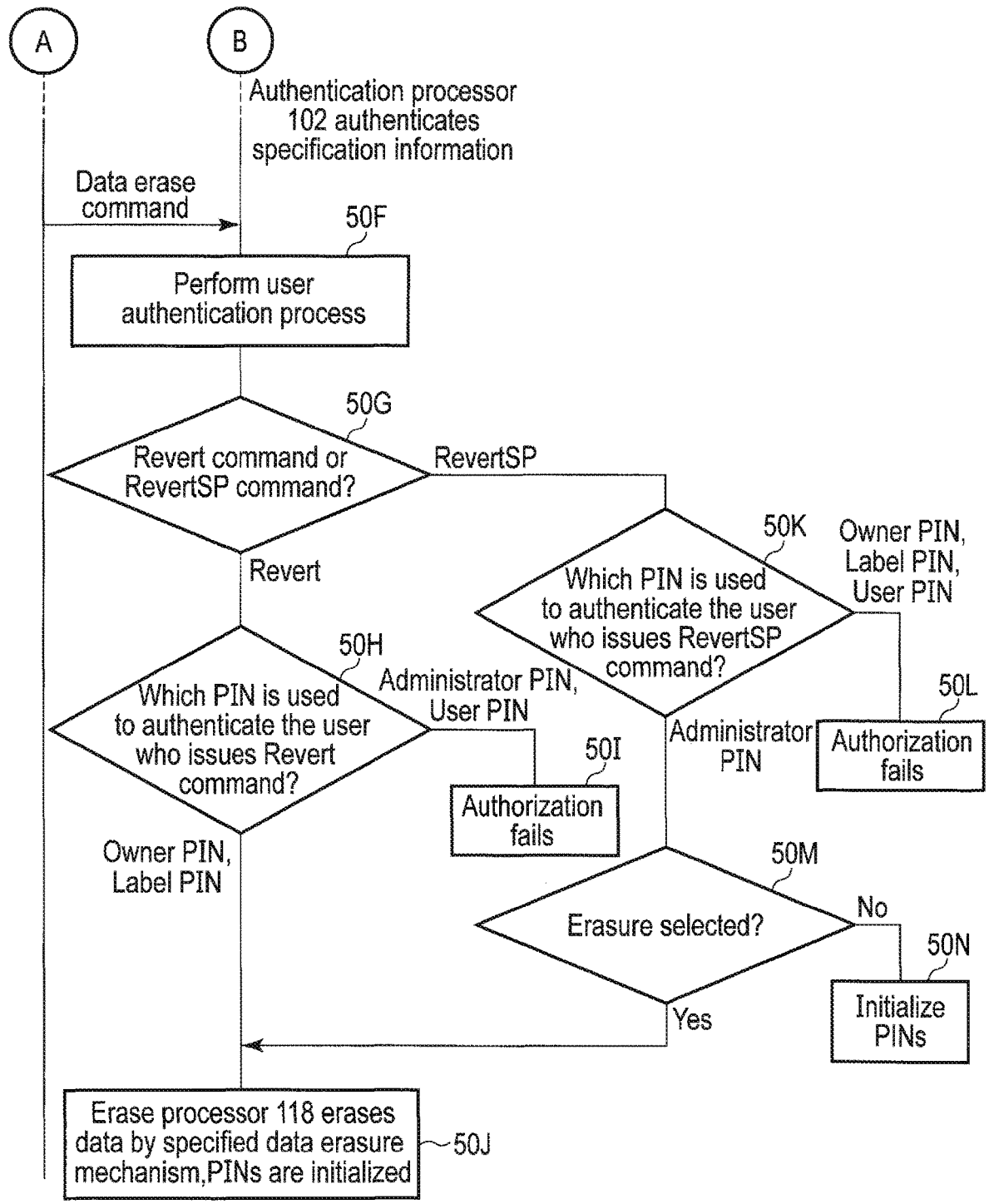

FIG. 5A and FIG. 5B show an example of the sequence of data erasing for resetting the storage device 12.

Prior to reset, the host device 14 transfers, to the storage device 12, a data erasure mechanism indicator request to inquire the data erasure mechanism supported by the storage device 12. For example, this request is transferred when the host device 14 is booted.

The data erasure mechanism indicator request received in the data erasure mechanism indicator request reception module 108 is transferred to the data erasure mechanism indicating module 106. In step 50A, the data erasure mechanism indicating module 106 obtains, from the erase information manager 124, information indicating one or more erasure mechanisms supported by the storage device 12. The data erasure mechanism indicating module 106 sends back data erasure mechanism response information indicating the obtained data erasure mechanism(s) to the host device 14.

Now, examples of data erasure mechanism indicator are described with reference to FIGS. 6A and 6B. Here, Level 0 Discovery Header and Level 0 Discovery Response Data Format are applied, which are defined in TCG Storage, Security Subsystem Class: Opal, Specification Version 2.01, Revision 1.00. FIG. 6A shows an example of a data erasure mechanism indicator request using Level 0 Discovery Header. Level 0 Discovery Header only instructs the storage device 12 to send back Level 0 Discovery Response. Level 0 Discovery Header includes only a header portion and does not include a body portion.

FIG. 6B shows an example of erasure mechanism response information to which Level 0 Discovery Response is applied. Level 0 Discovery Response includes Level 0 Discovery Header shown in FIG. 6A and a body portion. In Feature Descriptor which is the body portion, plural feature descriptors are defined.

As shown in FIG. 7A, one of Feature Descriptors corresponds to erasure mechanisms. FIG. 7B shows an example of the data structure of Feature Descriptor. Feature Descriptor includes a header portion and a body portion. Byte 0-3 is the header portion. Byte 4-n is the body portion. The header portion includes Feature code. Feature Descriptor data of the data erasure mechanism supported by the storage device 12 is described in Byte 4. Data erasure mechanism is allocated to the respective bits of Byte 4 as shown in FIG. 7C. When each bit is "1", its data erasure mechanism is supported. When each bit is "0", its data erasure mechanism is not supported. For example, when bit 0 of Feature Descriptor data is "1", overwrite data erasure is supported. When bit 1 is "1", block erasure is supported. When bit 2 is "1", unmap is supported. When bit 3 is "1", reset write pointers are supported. When bit 4 is "1", encryption key updating (crypto erasure) is supported.

Returning to the explanation of the sequence of data erasing shown in FIG. 5A and FIG. 5B, the following situation is assumed. When the host device 14 receives information indicating a single data erasure mechanism from the storage device 12, the host device 14 specifies the data erasure mechanism. When the host device 14 receives information indicating a plurality of data erasure mechanisms, the host device 14 selects one of them, and notifies the storage device 12 of information indicating the selected data erasure mechanism. However, there is a probability that the host device 14 specifies a data erasure mechanism other than the above data erasure mechanisms. For example, the host device 14 may set a data erasure mechanism to the storage device 12 by Set command including a parameter indicating data erasure mechanism information.

The data erasure mechanism specification information received in the storage device 12 is transferred to the authentication processor 102. The authentication processor 102 performs authentication process of the user who issues Set command specifying the data erasure mechanism in step 50B. In step 50C, the authorization processor 104 checks which PIN is used to authenticate the user who issues Set command to check whether or not the user has the authority to issue Set command. When Set command is issued by the user authenticated with Label PIN or User PIN, the authorization processor 104 determines that the authentication fails and transfers information indicating that the authorization fails to the host device 14 in step 50D. When Set command is issued by the user authenticated with Owner PIN or Administrator PIN, the authorization processor 104 determines that the authorization is successful. When the authorization is successful, the erase information manager 124 checks whether or not the storage device 12 supports the data erasure mechanism specified by the host device 14 in step 50C-1. When the data erasure mechanism specified by the host device 14 is not supported by the storage device 12 (NO in step 50C-1), the erase information manager 124 transfers information indicating a specification error to the host device 14 in step 50D-1. When the data erasure mechanism specified by the host device 14 is supported by the storage device 12 (YES in step 50C-1), the erase information manager 124 sets the data erasure mechanism specified by the host device 14 in the erase processor 118 in step 50E.

Subsequently, when there is a need to reset the storage device 12, the host device 14 notifies the storage device 12 of a reset command (data erase command). The host device 14 may notify the storage device 12 of a data erase command with, for example, Revert command or RevertSP command.

The data erase command received in the storage device 12 is transferred to the authentication processor 102. The authentication processor 102 performs authentication process of the user who issues Revert command or RevertSP command which is the erase command in step 50F. The authorization processor 104 checks whether the received command is Revert command or RevertSP command in step 50G.

When Revert command is received, the authorization processor 104 checks which PIN is used to authenticate the user who issues of Revert command in step 50H to check whether or not the user has the authority to issue Revert command. When Revert command is issued by the user authenticated with Administrator PIN or User PIN, the authorization processor 104 determines that the authorization fails in step 50I. Neither data erasing nor the initialization of PINs is performed. When Revert command is issued by the user authenticated with Owner PIN or Label PIN, the authorization processor 104 determines that the authorization is successful. In step 50J, the erase processor 118 erases data by the specified data erasure mechanism, and the PIN manager 112 initializes Owner PIN, Administrator PIN and User PIN. In this way, the storage device 12 transitions to the inactive state (shipping state) 40A shown in FIG. 4.

When a RevertSP command is received, the authorization processor 104 checks which PIN is used to authenticate the user who issues RevertSP command in step 50K to check whether or not the user has the authority to issue RevertSP command. When RevertSP command is issued by the user authenticated with Owner PIN, Label PIN or User PIN, the authorization processor 104 determines that the authorization fails in step 50L. Neither data erasing nor the initialization of PINs is performed. When RevertSP command is issued by the user authenticated with Administrator PIN, the authorization processor 104 determines that the authorization is successful. Whether or not data erasure is specified by a parameter in RevertSP command is checked in step 50M. When data erasure is specified (YES in step 50M), in step 50J, the erase processor 118 erases data by the specified data erasure mechanism, and the PIN manager 112 initializes Administrator PIN and User PIN. When data erasing is not specified (NO in step 50M), in step 50N, the PIN manager 112 initializes Administrator PIN and User PIN. In this way, the storage device 12 transitions to the inactive state 40B shown in FIG. 4.

As explained above, the storage device 12 notifies the host device 14 of the data erasure mechanism(s) the storage device 12 supports. The host device 14 is capable of specifying a data erasure mechanism for the storage device 12 based on the information. The storage device 12 checks the authority of the user who specified the data erasure mechanism. When the user has authority, the storage device 12 sets the specified data erasure mechanism. When reset is actually performed, the host device 14 supplies a reset command to the storage device. The storage device 12 checks the authority of the user who issues the reset command. When the user has authority, the storage device 12 erases data in accordance with the set data erasure mechanism, and initializes PINs.

In this manner, even when unencrypted data is stored in the storage device 12, the storage device 12 can be reset. Data does not leak out from the reset storage device 12 after disposal. Security can be ensured. As encrypted data is not stored in the storage device 12, the host device 14 does not need to have an encryption application program. The processing load of the host device 14 is less. Since an encryption circuit is unnecessary, the manufacturing cost of the storage device 12 can be reduced.

The storage device 12 does not set single access authority (unlock) in the entire storage area. The storage device 12 is capable of dividing the storage area into a plurality of areas (ranges) based on LBA ranges and setting access authority (in other words, a PIN necessary for unlocking) for each range. The concept of ranges is described later with reference to FIG. 13. For example, as shown in FIG. 8, range 2 may be set to an unlocked state where anybody can access only the user and administrator who normally use the storage device can unlock the range. Range 3 may be set to a locked state where only the administrator can unlock the range. By dividing the storage area of the storage device 12 into a plurality of ranges, a plurality of users can share the storage device 12 while maintaining the security one another.

[Management of Erasing Process]

Figures 9A, 9B:
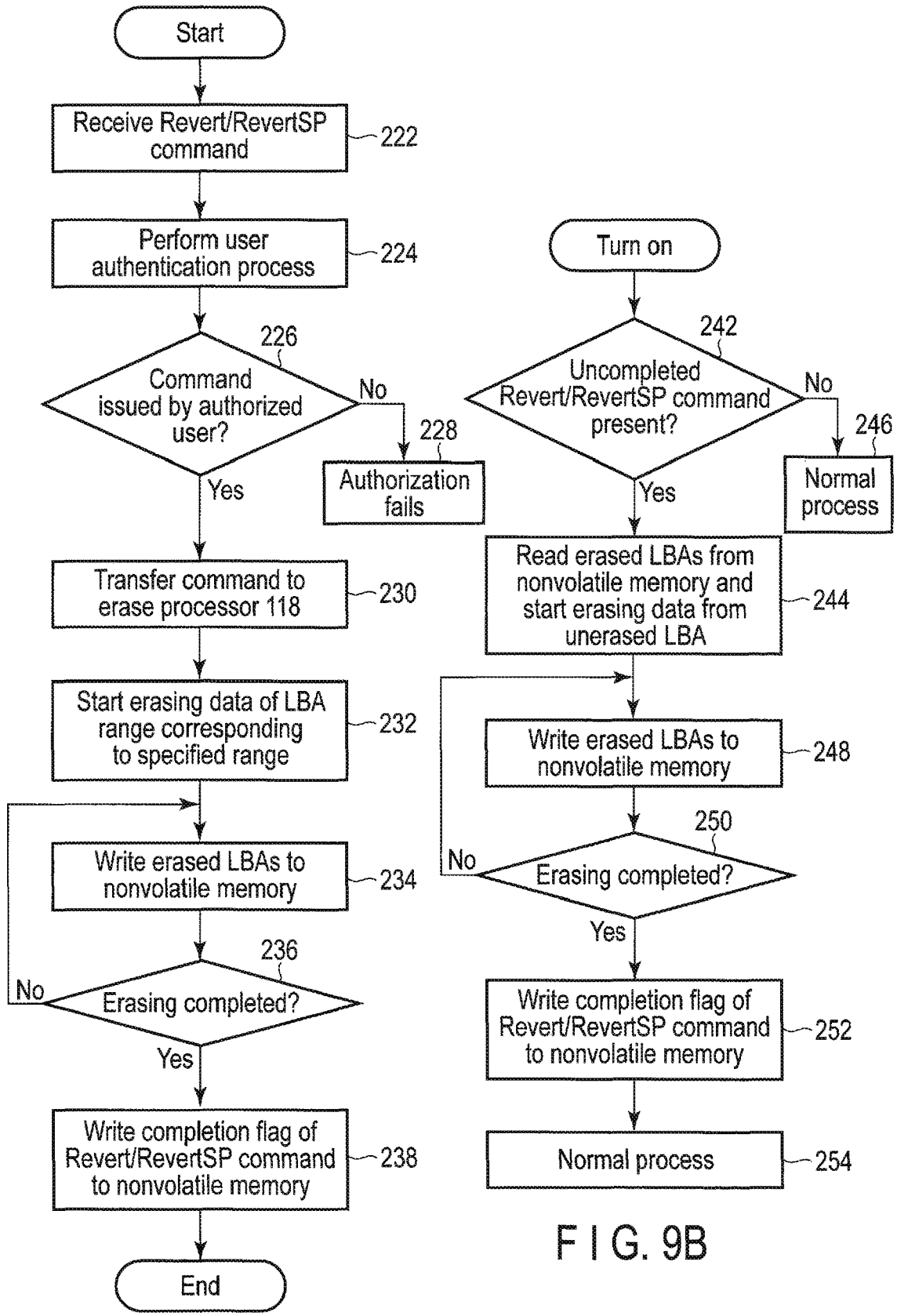
FIG. 9A is a flowchart showing an example of data erasing including data management in preparation for power discontinuity.
FIG. 9B is a flowchart showing an example of a process for restarting Revert/RevertSP command when power is restored.

FIG. 9A is a flowchart showing an example of an erasing process in preparation for power discontinuity. The storage device 12 receives Revert/RevertSP command ("/" means "or") in step 222. The authentication processor 102 performs authentication process of the user who issues Revert command or RevertSP command in step 224. The authorization processor 104 checks the authority of the user who issues Revert/RevertSP command and determines whether or not the command is issued by the user having the authority in step 226. When the Revert/RevertSP command is not issued by the user having the authority to issue the command, the authorization fails in step 228.

When Revert/RevertSP the command is issued by the user having the authority to issue the command, the authorization processor 104 transfers Revert/RevertSP command to the erase processor 118 in step 230. In step 232, the erase processor 118 analyzes Revert/RevertSP command and determines to which range Revert/RevertSP command is related. The erase processor 118 (area erase module 118a) obtains an LBA range corresponding to the range of the result of determination, for example, LBA X-Y, and starts erasing data from the initial LBA X. While data is erased, the erase information manager 124 writes the erased LBAs to a nonvolatile memory in step 234. The nonvolatile memory may be realized by a flash memory provided in the erase information manager 124 or may be realized by a part of the storage module 34. The erase processor 118 determines whether or not data erasing in the LBA range corresponding to the range of the result of determination is completed in step 236. When data erasing is not completed, the erase processor 118 continues to erase data. When data erasing is completed, the erase processor 118 causes the erase information manager 124 to write a completion flag indicating that the process of Revert/RevertSP command is completed to the nonvolatile memory in step 238.

Even when power discontinuity occurs in the process of Revert/RevertSP command, information indicating that the process of Revert/RevertSP command is uncompleted and the erased LBAs are stored in the nonvolatile memory. Thus, the storage device 12 is capable of effectively restart the uncompleted Revert/RevertSP command from the LBA whose data is not erased when power is restored. There is no need to erase data from the beginning of the LBA range after the restart. Thus, the time required to erase data is not needlessly lengthened.

FIG. 9B is a flowchart showing an example of a process for restarting Revert/RevertSP command when power is restored. When power is turned on, the erase information manager 124 determines whether or not uncompleted Revert/RevertSP command is present in step 242. When uncompleted Revert/RevertSP command is not present, a normal process is performed in step 246. When an uncompleted Revert/RevertSP command is present, in step 244, the erase information manager 124 reads the erased LBAs from the nonvolatile memory, sets the erased LBAs to the erase restarting address of the erase processor 118, and causes the erase processor 118 the erase restarting address). While data is erased, the erase information manager 124 writes the erased LBAs to the nonvolatile memory in step 248. The erase processor 118 determines whether or not the data erasing of the range whose data is erased in progress is completed in step 250. When the data erasing is not completed, the erase processor 118 continues to erase data. When the data erasing is completed, in step 252, the erase processor 118 causes the erase information manager 124 to write a completion flag indicating that the process of Revert/RevertSP command is completed to the nonvolatile memory. Subsequently, a normal process is performed in step 254.

As shown in FIGS. 5A and 5B, the erasing process shown in FIGS. 9A and 9B may be performed after the storage device 12 notifies the host device 14 of the data erasure mechanism(s) the storage device 12 supports and the host device 14 specifies a data erasure mechanism. Alternatively, the erasing process shown in FIGS. 9A and 9S may be independently performed regardless of the procedure shown in FIGS. 5A and 5B.

[Exclusive Control of Data Erasing]

Exclusive control for prioritizing the data erasing process which is performed in progress is explained with reference to FIG. 10 to FIG. 12.

Figure 10:
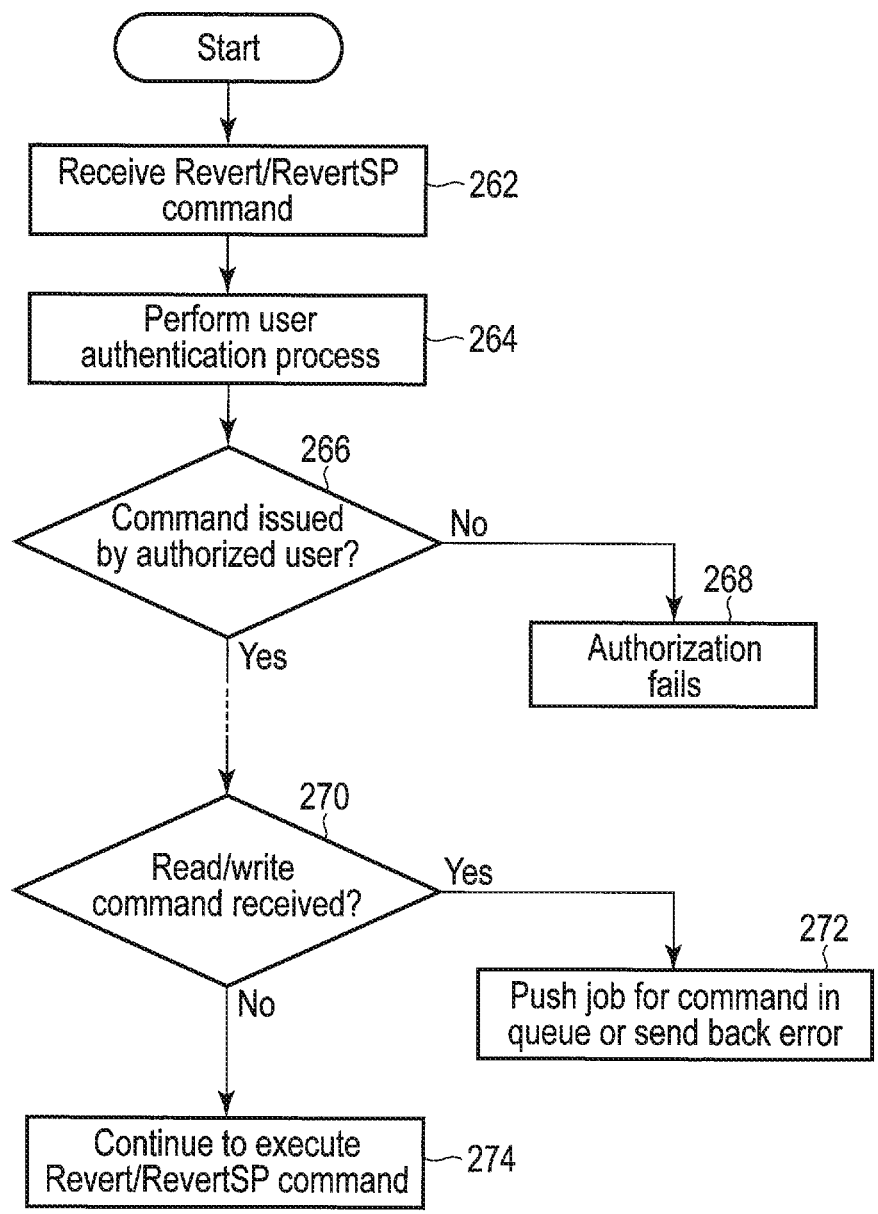
FIG. 10 is a flowchart showing an example of data erasing for rejecting access while data is erased.

FIG. 10 is a flowchart showing an example of a process for rejecting access while data is erased and prioritizing the erasing process. The storage device 12 receives Revert/RevertSP command in step 262. The authentication processor 102 performs authentication process of the user who issues Revert command or RevertSP command in step 264. The authorization processor 104 checks the authority to issue Revert/RevertSP command and determines whether or not Revert/RevertSP command is issued by the user having the authority to issue the command in step 266. When Revert/RevertSP command is not issued by the user having the authority to issue the command, the authorization fails in step 268.

When Revert/RevertSP command is issued by the user having the authority to issue the command, the storage device 12 determines whether or not a read/write command is received from the host device 14 while Revert/RevertSP command is executed in step 270. When a read/write command is received, the storage device 12 pushes a job for the read/write command in a queue, or sends back an error to the host device 14 in step 272. The queue may be provided in, for example, the read/write processor 122. When a read/write command is not received, the storage device 12 continues to execute Revert/RevertSP command in step 274.

The user does not know that a data erase operation is completed to which LBA at present. Therefore, the user does not recognize, when data is written while erasing data, whether the data is to be written into an area in which a data erase operation is completed or an area in which a data erase operation is not completed. If data is written into the area in which a data erase operation is completed, the written data remains in the area. If data is written into the area in which a data erase operation is not completed, the written data is erased. However, the user cannot perform respective controls depending on whether the data is to be written into an area in which a data erase operation is completed or an area in which a data erase operation is not completed, and thus the user may be confused. The user may issue a write command assuming that the written data remains in the area or assuming that the written data is erased. In both assumptions, the written data may remain or be erased depending on the situation so that expected result is not obtained. According to the embodiment, the storage device 12 does not perform read/write operation during a data erase operation, thereby the user confusion is prevented.

As shown in FIGS. 5A and 5B, the erasing process shown in FIG. 10 may be performed after the storage device 12 notifies the host device 14 of the data erasure mechanism(s) the storage device 12 supports and the host device 14 specifies a data erasure mechanism. Alternatively, the erasing process shown in FIG. 10 may be independently performed regardless of the procedure shown in FIGS. 5A and 5B.

Figure 11:
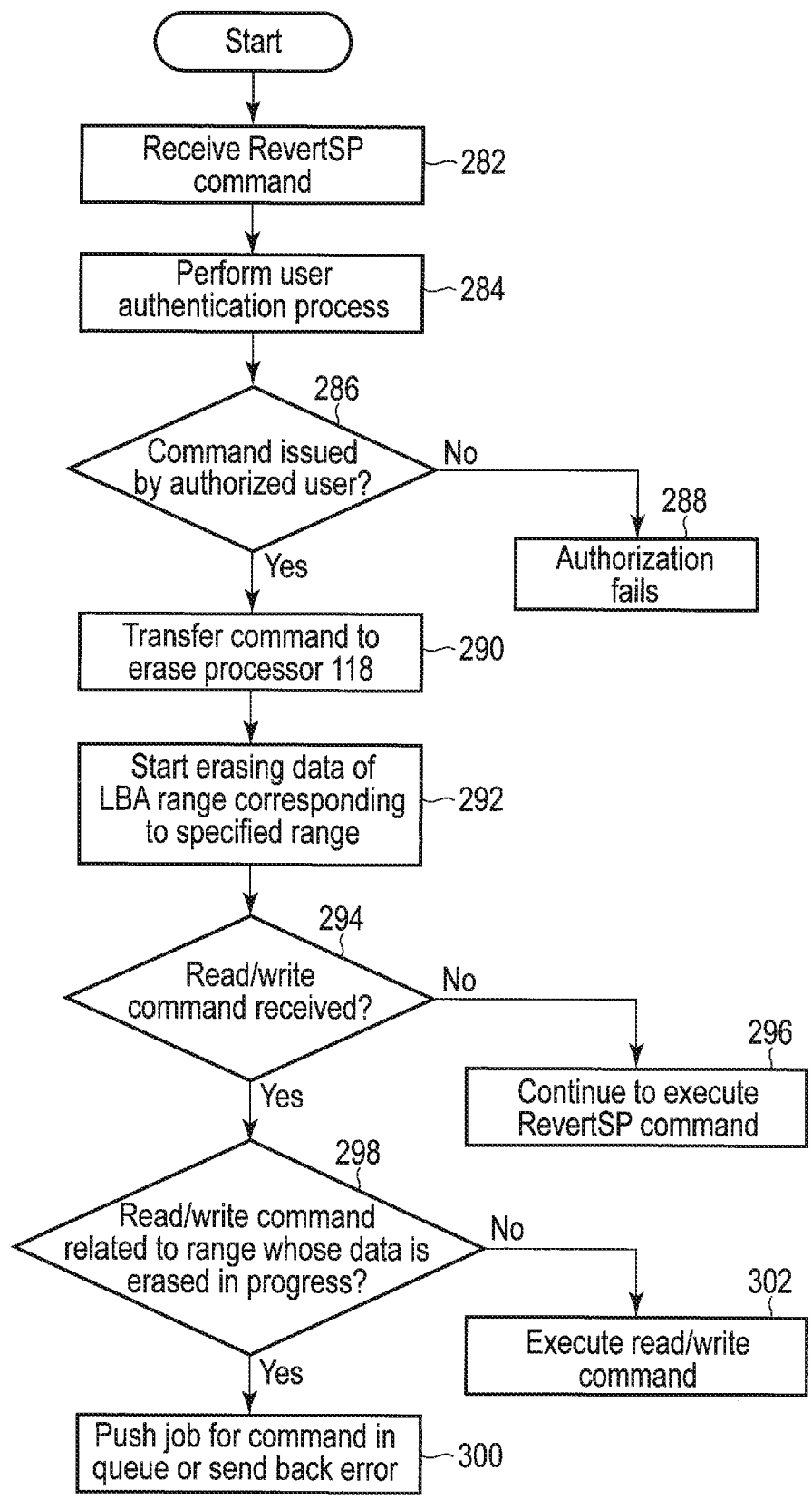
FIG. 11 is a flowchart showing an example of data erasing for rejecting access to a range in which data erasing is in progress.

FIG. 11 is a flowchart showing an example of the rejection of access to a range whose data is erased in progress as the second example of the exclusive control of a data erasing process. Access to a range other than the range whose data is erased in progress is permitted. In the process of FIG. 10, plural areas are not defined in the storage area. However, in the process of FIG. 11, plural areas (ranges) are defined in the storage area. The storage device 12 receives RevertSP command in step 282. The authentication processor 102 performs authentication process of the user who issues RevertSP command in step 284. The authorization processor 104 checks the authority to issue RevertSP command, and determines whether or not RevertSP command is issued by the user having the authority to issue the command in step 286. When RevertSP command is not issued by the user having the authority to issue the command, the authorization fails in step 288.

When RevertSP command is issued by the user having the authority to issue the command, the authorization processor 104 transfers RevertSP command to the erase processor 118 in step 290. In step 292, the erase processor 118 analyzes RevertSP command and determines to which range RevertSP command is related. The erase processor 118 (area erase module 118a) starts erasing the data of an LBA range corresponding to the range of the result of determination. The storage device 12 determines whether or not a read/write command is received from the host device 14 while data is erased in step 294. When a read/write command is not received, the storage device 12 continues to execute RevertSP command in step 296.

When a read/write command is received, the storage device 12 determines whether or not the received read/write command is a read/write command relating the range whose data is erased in progress. When the received read/write command relates to the range whose data is erased in progress, the storage device 12 pushes a job for the command in a queue or sends back an error to the host device 14 in step 300. When the received read/write command does not relate to a range other than the range whose data is erased in progress, the storage device 12 executes the read/write command regarding the range other than the range whose data is erased in progress in step 302.

In this way, even when, while data erasing is performed for an area, writing to a different area is performed, normal data writing and reading can be performed in the different area as data erasing is not performed in the different area. In the area in which data erasing is performed, as described above, exclusive control which does not execute access other than erasing is performed. This configuration prevents data from remaining or being erased contrary to the user's expectation.

As shown in FIGS. 5A and 5B, the erasing process shown in FIG. 11 may be performed after the storage device 12 notifies the host device 14 of the data erasure mechanism(s) the storage device 12 supports and the host device 14 specifies a data erasure mechanism. Alternatively, the erasing process shown in FIG. 11 may be independently performed regardless of the procedure shown in FIGS. 5A and 5B.

Figure 12:
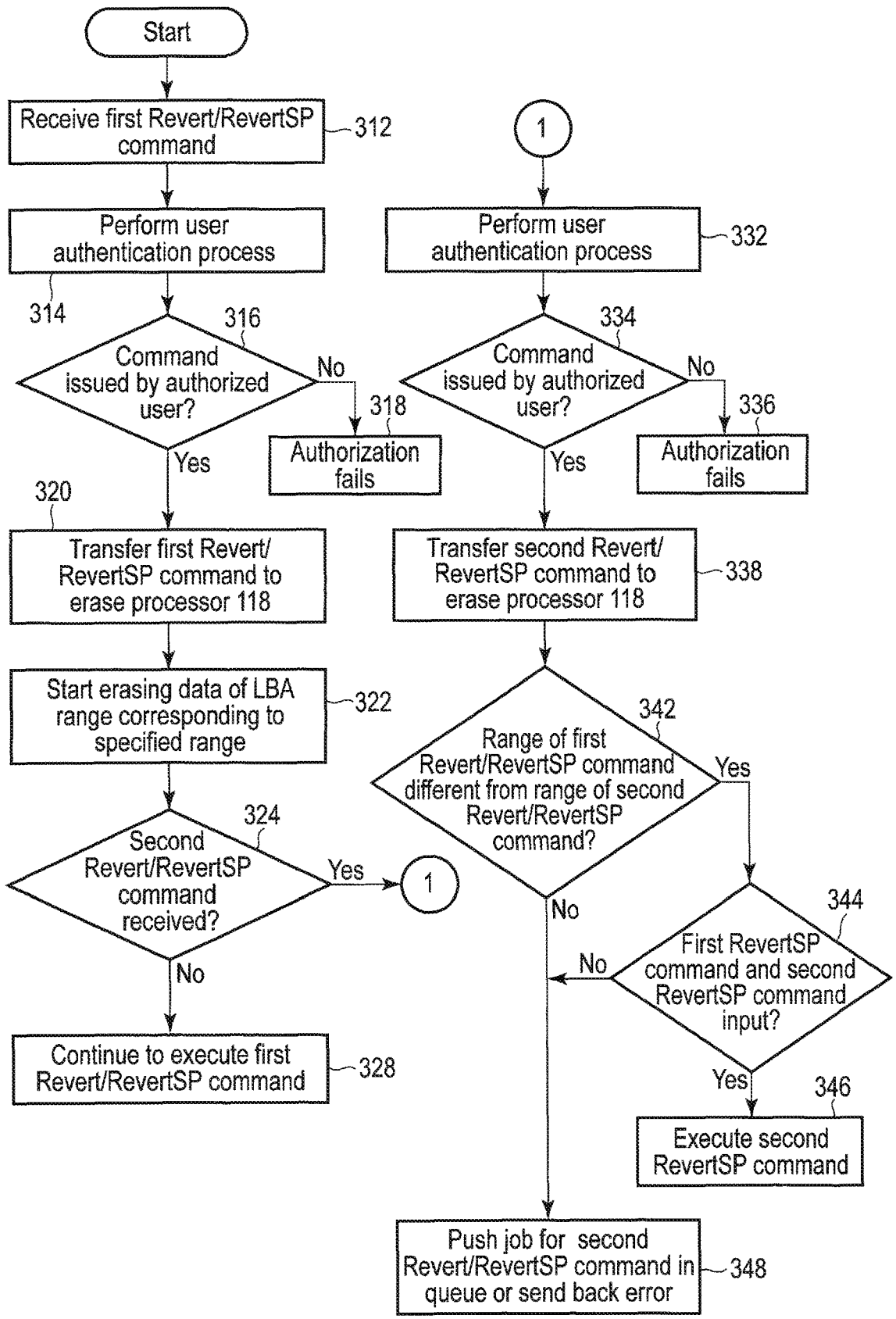
FIG. 12 is a flowchart showing an example of data erasing for rejecting a command for simultaneous erasing for a plurality of ranges.

FIG. 12 is a flowchart showing an example of the execution control of a plurality of Revert/RevertSP commands as the third example of the exclusive control of a data erasing process. The storage device 12 receives the first Revert/RevertSP command in step 312. The authentication processor 102 performs authentication process of the user who issues the first Revert/RevertSP command in step 314. The authorization processor 104 checks the authority to issue the first Revert/RevertSP command, and determines whether or not the first Revert/RevertSP command is issued by the user having the authority to issue the command in step 316. When the first Revert/RevertSP command is not issued by the user having the authority to issue the command, the authorization fails in step 318.

When first Revert/RevertSP command is issued by the user having the authority to issue the command, the authorization processor 104 transfers the first Revert/RevertSP command to the erase processor 118 in step 320. In step 322, the erase processor 118 analyzes the first Revert/RevertSP command and determines to which range the first Revert/RevertSP command is related. The erase processor 118 (area erase module 118a) starts erasing the data of an LBA range corresponding to the range of the result of determination. The storage device 12 determines whether or not the second Revert/RevertSP command is received while data is erased in step 324. Step 324 may be performed before step 322.

When the second Revert/RevertSP command is not received, the storage device 12 continues to execute the first Revert/RevertSP command in step 328. When the second Revert/RevertSP command is received, the authentication processor 102 performs authentication process of the user who issues the second Revert/RevertSP command in step 332. The authorization processor 104 checks the authority to issue the second Revert/RevertSP command and determines whether or not the second Revert/RevertSP command is issued by the user having the authority to issue the command in step 334. When the second Revert/RevertSP command is not issued by the user having the authority to issue the command, the authorization fails in step 336.

When the second Revert/RevertSP command is issued by the user having the authority to issue the command, the authorization processor 104 transfers the second Revert/RevertSP command to the erase processor 118 in step 338. In step 342, the erase processor 118 analyzes the second Revert/RevertSP command, determines to which range the second Revert/RevertSP command is related, and determines whether or not the range of the first Revert/RevertSP command is different from the range of the second Revert/RevertSP command.

When the range of the second Revert/RevertSP command is different from the range of the first Revert/RevertSP command, the erase processor 118 determines whether or not the received two commands are the first RevertSP command and the second RevertSP command in step 344. When the two commands are the first RevertSP command and the second RevertSP command, the ranges of the two received RevertSP commands are different from each other. Thus, the erase processor 118 also executes the second RevertSP command in step 346. Instead of the execution of the second RevertSP command in step 346, a Job for the second RevertSP command may be pushed in a queue.

When it is determined that the range of the second Revert/RevertSP command is the same as the range of the first Revert/RevertSP command in step 342, or when it is determined that the combination of the two commands is not the combination of the first RevertSP command and the second RevertSP command in step 344, the data erasing module 118 pushes a job for the second Revert/RevertSP command in a queue or sends back an error to the host device 14 in step 348. The combinations of the first and second commands include the combinations of (i) the first Revert command and the second Revert command, (ii) the first Revert command and the second RevertSP command, (iii) the first RevertSP command and the second Revert command and (iv) the first RevertSP command and the second RevertSP command. With regard to the combination of (iii) the first RevertSP command and the second RevertSP command, when the range of the first command is different from the range of the second command, as shown in step 346, the second RevertSP command is executed in addition to the first RevertSP command. With regard to the other combinations of (i) the first Revert command and the second Revert command, (ii) the first Revert command and the second RevertSP command and (iv) the first RevertSP command and the second Revert command, the second command is not performed as shown in step 348 even when the range of the first command is either the same as or different from the range of the second command.

In this way, the storage device 12 is capable of focusing on executing each Revert/RevertSP command. Thus, the time required to erase data is not lengthened.

As shown in FIGS. 5A and 5B, the erasing process shown in FIG. 12 may be performed after the storage device 12 notifies the host device 14 of the data erasure mechanism(s) the storage device 12 supports and the host device 14 specifies a data erasure mechanism. Alternatively, the erasing process shown in FIG. 12 may be independently performed regardless of the procedure shown in FIGS. 5A and 5B.

[Erasing Areas by Namespaces]

FIG. 13 schematically shows the storage area of the storage device 12. Namespaces are defined in NVM Express, Revision 1.3, May 1, 2017. A namespace is a quantity of nonvolatile memory that may be formatted into logical blocks. A namespace is each of the partial areas into which the entire storage area of the storage device 12 is divided, and is specifically, a collection of logical blocks. At least one namespace identified by a namespace ID can be defined for a single storage device. A namespace of size "n" includes logical blocks with logical block addresses 0 to "n−1." A namespace global range is provided in each namespace. Each namespace global range includes a plurality of ranges. As described above, different PINs can be set for the ranges, respectively. A global range ranges over a plurality of namespaces.

Partial areas into which the entire storage area is divided may be partitions. The partitions are partial areas managed by the host device 14. Namespaces are partial areas managed by the host device 14 and the storage device 12. When the host device 14 accesses a partition, the host device 14 specifies the logical address included in the partition to be accessed. When the host device 14 accesses a namespace, the host device 14 specifies the namespace to be accessed. The area information manager 114 of the storage device 12 manages the relationship between namespaces and ranges as shown in FIG. 13.

FIG. 14A is a flowchart showing an example of erasing data in namespace units by the erase processor 118 (areas erase module 118b). In step 402, the storage device 12 receives a data erase command in namespace units from the host device 14. Parameters can be added to each data erase command. Thus, a data erase command in namespace units may be realized by adding the parameter of a namespace. Alternatively, since parameters can be added to Revert/RevertSP command, the parameter of a namespace may be added such that Revert/RevertSP command for executing erasing in namespace units is an erase command in namespace units. Data in all the ranges in the specified namespace are collectively erased in step 404. Further, as shown in FIG. 14B, a namespace table indicating for which namespace an erasing process should be performed by Revert/RevertSP command may be defined. A namespace can be registered with the namespace table by using Set command and specifying the namespace ID with a parameter of Set command. The erasing in namespace units includes both erasing data in a single namespace and erasing data in all the namespaces (in other words, a global range). When 00h or FFh is specified by the parameter, the parameter may be regarded in a manner that all the namespaces are specified.

FIG. 14O shows an example in which the namespace table is set. When the storage device 12 receives Set command in step 412, the storage device 12 sets the namespace ID specified by the parameter in the namespace table. When the namespace ID is 00h or FFh, all the namespace IDs are set in the namespace table. Subsequently, when the storage device 12 receives Revert/RevertSP command from the host device (step 414), in step 416, the storage device 12 refers to the namespace table, obtains namespace ID(s), and erases the data of all the ranges included in the namespace(s) corresponding to the obtained namespace ID(s).

In this way, in a case where the storage device 12 includes a plurality of namespaces, and each namespace includes a plurality of ranges, when the host device 14 merely gives a data erase command in namespace units, the storage device 12 is capable of easily erasing the data of all the ranges included in the specified namespace(s). As the host device 14 does not need to manage the relationship between namespaces and ranges, the structure of the application program of the host device 14 is simplified. Thus, the cost can be reduced.

As shown in FIGS. 5A and 5B, the erasing process shown in FIG. 14A may be performed after the storage device 12 notifies the host device 14 of the data erasure mechanism(s) the storage device 12 supports and the host device 14 specifies a data erasure mechanism. Alternatively, the erasing process shown in FIG. 14A may be independently performed regardless of the procedure shown in FIGS. 5A and 5B.

Some erasing operations are explained with reference to FIGS. 9A to FIG. 14A. These erasing operations may be freely combined with each other to be performed.

According to the first embodiment, the storage device 12 notifies the host device 14 of the data erasure mechanism(s) the storage device 12 supports. The host device 14 specifies a data erasure mechanism. The storage device 12 erases data by the specified data erasure mechanism. Thus, even when unencrypted data is stored in the storage device 12, the storage device 12 can be reset. Data does not leak out from the reset storage device 12 after disposal. Security can be ensured. As encrypted data is not stored in the storage device 12, the host device 14 does not need to incorporate an encryption application program. The processing load of the host device 14 is less. Since an encryption circuit is unnecessary, the manufacturing cost of the storage device 12 can be reduced.

Other embodiments are explained below. In the following embodiments, only portions different from those of the first embodiment are explained, overlapping descriptions being omitted.

Second Embodiment

The probability that data leaks out from the storage device 12 which has been reset and discarded is not zero. When this probability should be as close to zero as possible, the storage device 12 may be physically destroyed and shredded such that the storage device 12 is not physically present. However, it takes time and effort to mechanically destroy and shred the storage device 12. A second embodiment allows the storage device 12 to be electrically destroyed.

Figure 15:
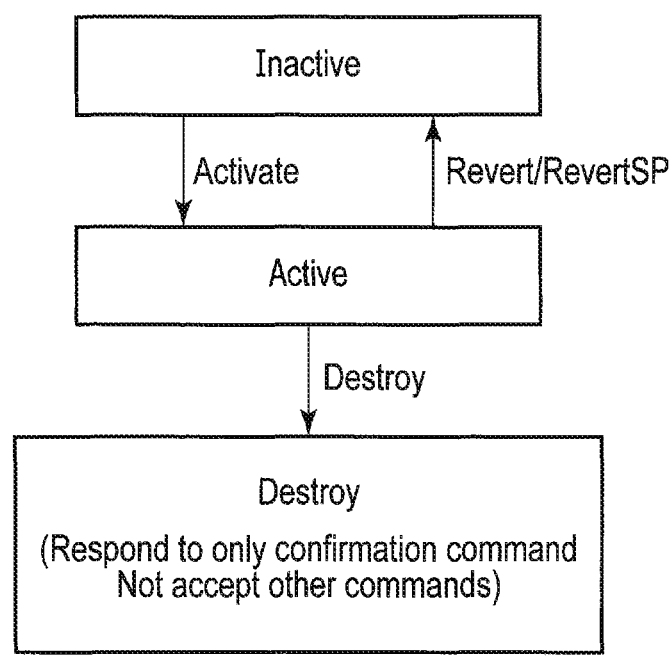
FIG. 15 shows another example of state transition of the storage device.

In the second embodiment, as shown in FIG. 15, as the state of the storage device 12, a destroy state is defined in addition to the active state and inactive state. When the host device 14 issues a destroy command to the storage device 12 in the active state, the storage device 12 transitions to the destroy state.

FIG. 17 shows the outline of a storage device 12A which may be set to the destroy state according to the second embodiment. The storage device 12A is different from the storage device 12 shown in FIG. 2 in respect that a destroy processor 116 is added. The destroy processor 116 is connected to the I/F processor 22, authorization processor 104, read/write processor 122, and erase processor 118. When the storage device 12A is in the destroy state, the destroy processor 116 instructs the read/write processor 122 to reject commands except a confirmation command.

FIG. 16A shows an example of the operations of setting the storage device 12A to the destroy state. The storage device 12A receives a destroy command in step 422. It is assumed that, in a manner similar to that of Revert/RevertSP command, a destroy command requires Owner PIN or Administrator PIN to be issued. Further, it is assumed that users other than the owner or administrator cannot issue a destroy command and cannot destroy the storage device 12. The authentication processor 102 performs authentication process of the user who issues the destroy command in step 424. The authorization processor 104 checks the authority to issue the destroy command, and determines whether or not the destroy command is issued by the user having the authority in step 426. When the destroy command is not issued by the user having the authority, the authorization fails in step 428.

When the destroy command is issued by the user having the authority to issue the command, in step 430, the storage device 12A accepts, of the commands from the host device 14, a confirmation command which inquires whether or not the current state is the destroy state, and the storage device 12A rejects the other commands, for example, read/write command. Further, the storage device 12A erases data and initializes PINs. Subsequently, the storage device 12A transitions to the destroy state. Thus, in a manner similar to that of the inactive state (shipping state) 40A, in the destroy state, neither Administrator PIN nor User PIN can be set, and further, both unlocking and locking are impossible. Commands other than the confirmation command are rejected. Thus, the storage device 12A in the destroy state is not able to transition to the other states such as the active state or inactive state.

FIG. 16B is a flowchart showing an example of the operation of the storage device 12A in the destroy state. When the storage device 12A receives a command (YES in step 434), the storage device 12A determines whether or not the received command is the confirmation command in step 436. When the received command is the confirmation command, the storage device 12A sends back destroy state information indicating that the current state is the destroy state to the host device 14 in step 440. When the received command is a command other than the confirmation command, the storage device 12A sends back error information indicating an error to the host device 14 in step 438.

In this way, when the storage device 12A receives a command for transition to the destroy state, the storage device 12 erases the data of the storage module 34 and sets PINs to the initial values. In the destroy state, the storage device 12 is not able to access the storage module 34, and the probability that data leaks out is as close to zero as possible. In the destroy state, the storage device 12 sends back a response indicating that the current state is the destroy state to the host device 14 in reply to the confirmation command from the host device 14. Thus, the host device 14 is able to confirm that the storage device 12 is in the destroy state, a failure state or a reset state (initial state of an inactive state or an active state). No destroy or scrapping device is required. Thus, the operational cost of the storage device 12A is low. The destroyed devices can be distinguished from faulty devices. Since faulty devices are not mistakenly disposed of, data leakage from the devices to be disposed of can be prevented.

In the above description, read/write command is rejected in the destroy state. However, read access to data allowed to leak out may be permitted. In other words, the storage area of data allowed to leak out may be a read-only area.

Third Embodiment

Figure 18:
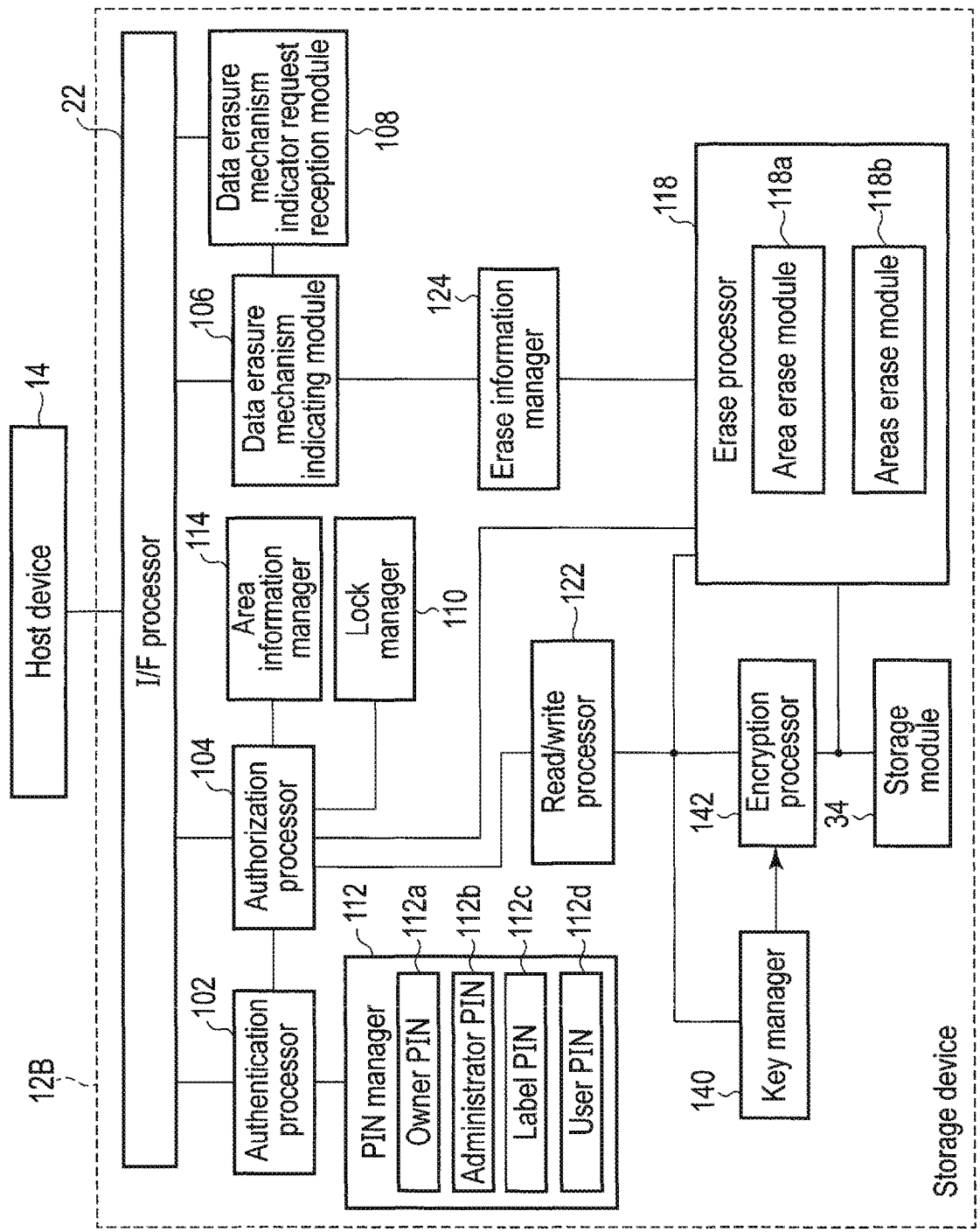
FIG. 18 shows an example of the configuration of a storage device according to a third embodiment.

In the above explanation, the storage device 12 does not include data encryption module and stores plaintext data. Now, the third embodiment of the storage device 12B which stores encrypted data is explained. FIG. 18 shows the outline of the storage device 12B according to the third embodiment. The storage device 12B is different from the storage device 12 shown in FIG. 2 in respect that an encryption processor 142 and a key manager 140 are added. The key manager 140 generates a key to encrypt data and stores the key in itself. The key is a random value generated by a random number generator. The encryption processor 142 encrypts the plaintext data input to the storage module 34, using the key. One of the examples of the algorithm of encryption is well-known common key algorithm such as an advanced encryption standard (AES). The encryption processor 142 performs a decrypting process for the encrypted data output from the storage module 34 with the same key as the key used for encryption, and returns the encrypted data to plaintext data. Data is always encrypted when it is written to the storage module 34. Data is always decrypted when it is read from the storage module 34.

As described above, the host device 14 includes a function for specifying the system of data erasing to be performed by the storage device 12B. As shown in FIG. 7C, the storage device 12B is capable of implementing crypto erasure as a data erasure mechanism. When the host device 14 specifies crypto erasure as the data erasure mechanism, and further when a command for data erasing is given by Revert command or RevertSP command, the erase processor 118 instructs the key manager 140 to update the key. When the key manager 140 is instructed to update the key, the key manager 140 generates the value of a new key by generating new random numbers, discards the value of the old key, and stores the value of the new key in itself. Thereafter, the encryption processor 142 performs an encrypting process and a decrypting process, using the key with the new value.

The value of the key is updated in this manner. In this regard, the data stored in the storage module 34 has been encrypted using the key with the old value. Thus, even when a decrypting process is performed for the stored data using the key with the new value, it is impossible to decrypt (restore) the stored data so as to be correct plaintext data. After the key is updated, the encrypting process and the decrypting process of the encryption processor 142 are meaningless. Thus, the execution of the encrypting process and decrypting process may be stopped. The key manager 140 shown in FIG. 18 instructs the encryption processor 142 to stop the encryption process and decrypting process after the key is updated.

Thus, even when encrypted data is stored in the storage device 12B, the host device 14 is capable of specifying a data erasure mechanism, and the storage device 123 is reset by the specified data erasure mechanism.

Fourth Embodiment

Figure 19:
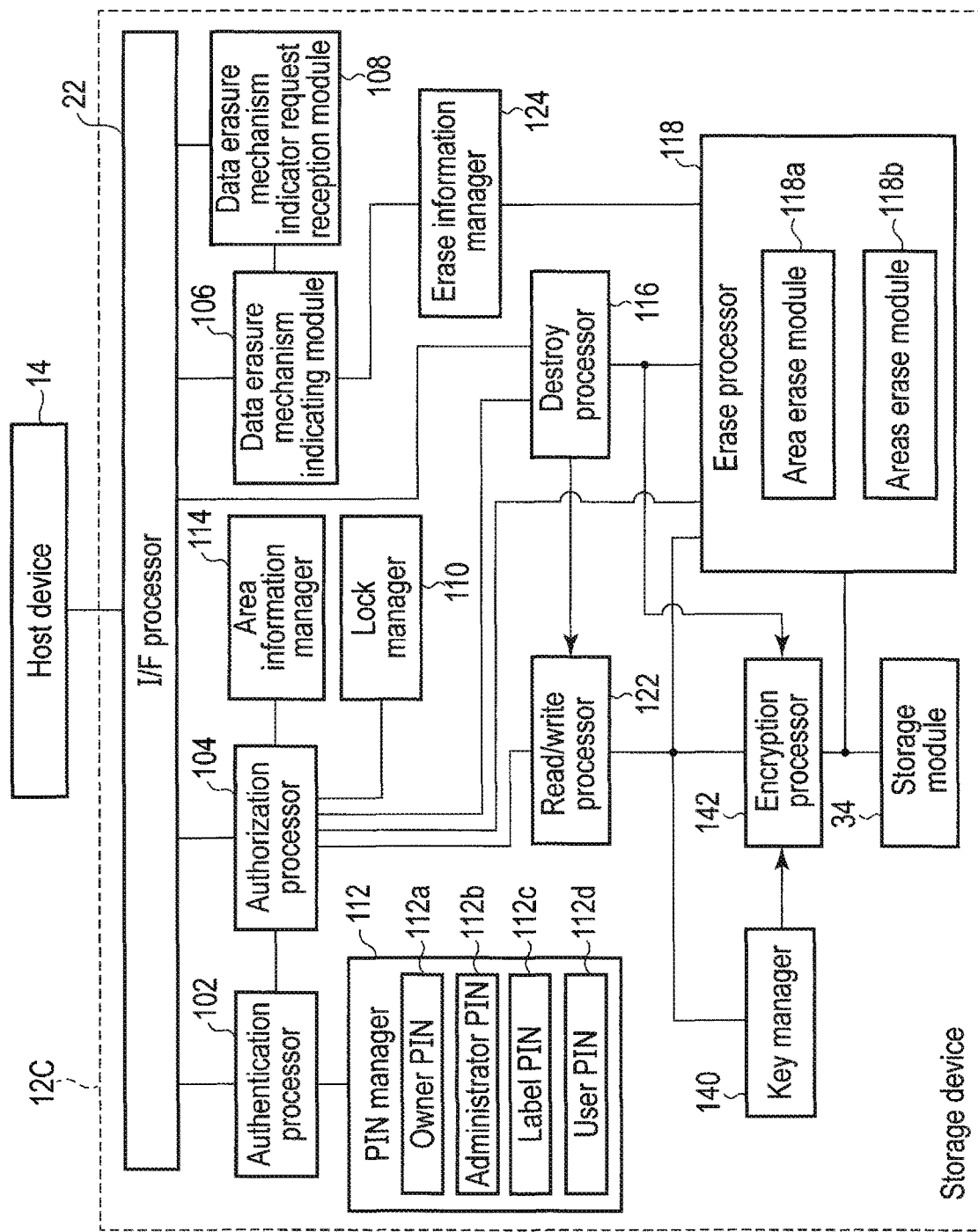
FIG. 19 shows an example of the configuration of a storage device according to a fourth embodiment.

FIG. 19 shows the outline of a storage device 120 in which encrypted data is stored, according to a fourth embodiment. The storage device 12C is different from the storage device 12B provided with the key manager 140 and encryption processor 142 in FIG. 18 in respect that a destroy processor 116 is added. The destroy processor 116 is connected to the I/F processor 22, authorization processor 104, read/write processor 122, erase processor 118 and encryption processor 142. When the storage device 12C is in the destroy state, the destroy processor 116 instructs the encryption processor 142 to disable the encryption function, and instructs the read/write processor 122 to reject commands except the confirmation command. Further, when the storage device 12B is in the destroy state, the key manager 140 may generate the value of a new key by generating new random numbers, discard the value of the old key and store the value of the new key in itself. After the value of the key is updated, it is impossible to decrypt the data encrypted with the key with the old value. When the storage device 12B is in the destroy state, the key manager 140 may instruct the encryption processor 142 to stop the encrypting process and decrypting process.

According to the fourth embodiment, the effects of the second embodiment and the third embodiment can be obtained.

Fifth Embodiment

In the first to fourth embodiments, the storage device 12, 12A, 12B or 120 is shipped to, for example, a PC vendor, in the inactive state 40A. The PC vendor sets SID, changes the storage device to the active state and ships it to an end user. The end user sets Administrator PIN and User PIN. In the first to fourth embodiments, the PC vendor needs to notify the end user of at least the initial value of Administrator PIN by, for example, describing it in the manual. A fifth embodiment shows a method for restoring the value of Administrator PIN indicated to the end user to the initial value without erasing data even when the end user lost Administrator PIN.

Figure 20:
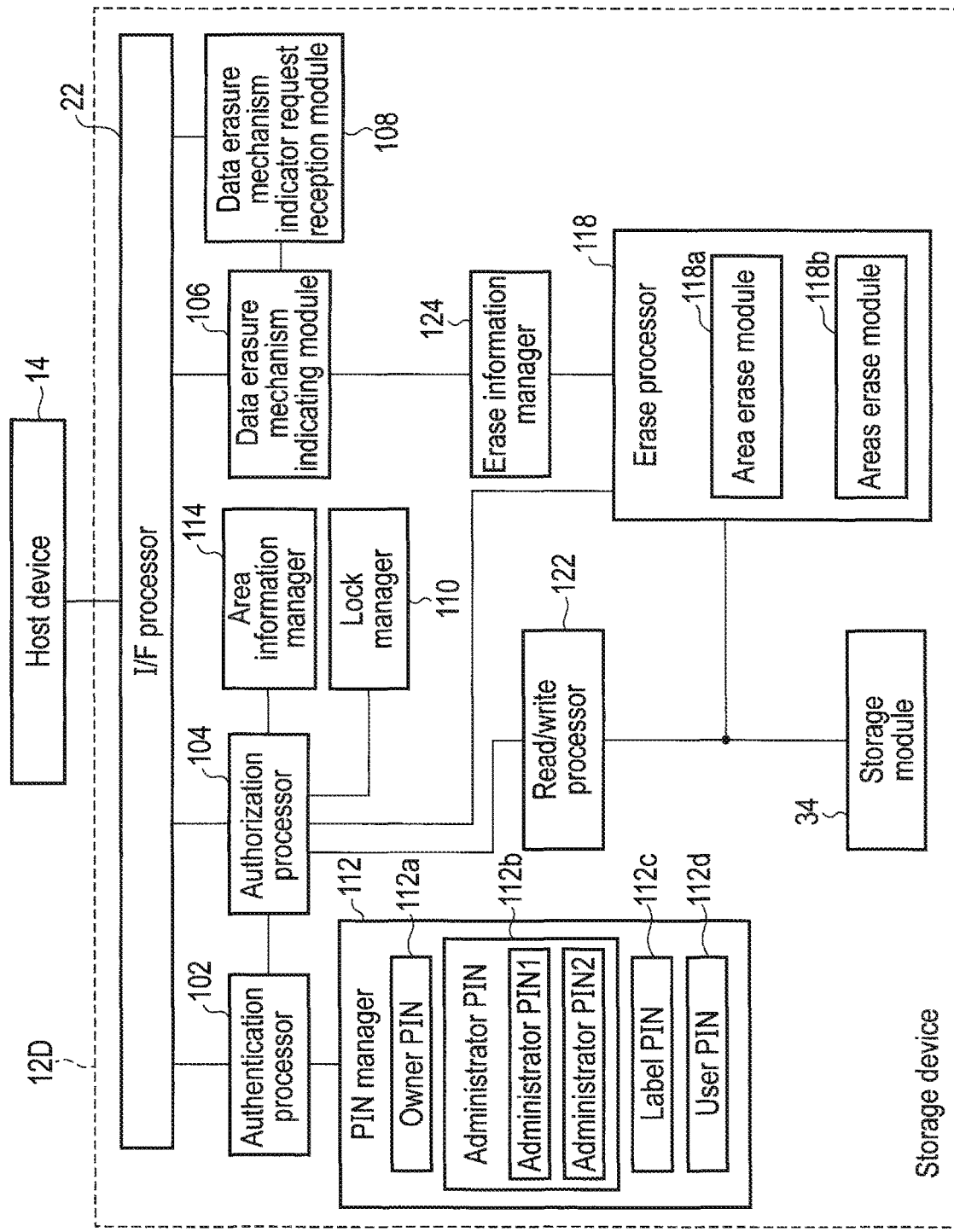
FIG. 20 shows an example of the configuration of a storage device according to a fifth embodiment.

In the fifth embodiment, as shown in FIG. 20, the PIN manager 112 of a storage device 12D includes a plurality of Administrator PINs. For example, Administrator PIN 1 and Administrator PIN 2 are defined. FIG. 20 shows a storage device 12D wherein a plurality of Administrator PINs are provided in the storage device 12 of the first embodiment. However, the storage device 12D may be structured such that a plurality of Administrator PINs are provided in the storage devices 12A, 12B and 12C of the second to fourth embodiments. When the PC vendor causes the storage device 12D to transition to the active state by Activate command, Administrator PIN 1 and Administrator PIN 2 are set to the initial values. The PC vendor sets the values of Administrator PIN 1 and Administrator PIN 2, The value of Administrator PIN 1 is indicated to the end user by, for example, describing it in the manual. However, the value of Administrator PIN 2 is not disclosed to the end user. The PC vendor appropriately manages the value of Administrator PIN 2 such that the value does not leak out to outside. The authority given by Administrator PIN 1 is separated from the authority given by Administrator PIN 2 as shown in FIG. 21. The authority of Administrator PIN 1 is allowed to view the value of Administrator PIN 1 by Get command and set the value of Administrator PIN 1 by Set command. However, the authority of Administrator PIN 1 is not allowed to view the value of Administrator PIN 2 by Get command or set the value of Administrator PIN 2 by Set command. Similarly, the authority of Administrator PIN 2 is allowed to view the value of Administrator PIN 2 by Get command and set the value of Administrator PIN 2 by Set command. However, the authority of Administrator PIN 2 is not allowed to view the value of Administrator PIN 1 by Get command or set the value of Administrator PIN 1 by Set command.

Administrator PIN 1 is managed by the user. Thus, the end user may know the value of Administrator PIN 1. When the value of Administrator PIN 2 is changed (set) by the authority of Administrator PIN 1, the value of Administrator PIN 2 is different from that of Administrator PIN 2 set in the factory of the PC vendor. To prevent this situation, the authority is separated such that the authority of Administrator PIN 1 is not allowed to view the value of Administrator PIN 2 (Get command) or set the value of Administrator PIN 2 (Set command). In FIG. 21, the authority of Administrator PIN 2 is allowed to neither set nor view Administrator PIN 1. However, at least the authority of Administrator PIN 1 should not be allowed to change Administrator PIN 2. Thus, access control may be set such that the authority of Administrator PIN 2 is allowed to set and view Administrator PIN 1.

As shown in FIG. 3A of the first embodiment, RevertSP command can be issued by Administrator PIN. The PC vendor performs a reset process with RevertSP command by Administrator PIN 2 based on a request from an end user. A command to perform a reset process, in other words, a command to execute RevertSP command, may be remotely transferred from the server managed by the PC vendor to the PC of the end user, for example, through the Internet. A parameter indicating whether data should be erased or maintained can be specified in RevertSP command. When the option for maintaining data is specified in Revert command by Administrator PIN 2, the data is maintained as it is. However, Administrator PIN 1 is initialized. Even after the storage device 12D is reset by RevertSP command, the storage device 12D may remain in the active state instead of the inactive state.

In this way, the storage device 12D is structured so as to define a plurality of Administrator PINs. In this structure, even when the end user lost Administrator PIN 1, Administrator PIN 1 can be initialized.

Sixth Embodiment

In the first to fifth embodiments, the storage device 12, 12A, 12B, 12C or 12D is shipped to, for example, a PC vendor, in the inactive state 40A. The PC vendor sets SID, changes the storage device to the active state and ships it to an end user. The end user sets Administrator PIN and User PIN. In a sixth embodiment, the following situation is assumed. The PC vendor sets SID. However, the PC vendor does not change the storage device to the active state, and ships it to an end user in the inactive state. The end user changes the storage device to the active state and sets Administrator PIN and User PIN.

As shown in FIG. 3A, to cause the storage device to transition from the inactive state to the active state, Owner PIN is required. In the above assumption, the PC vendor changes the initial value of Administrator PIN to a value which could be known to the PC vendor. As Activate command is executed on the end user side, Owner PIN needs to be input to the storage device on the end user side. To realize this situation, the following two methods are considered:

(1) the value of Owner PIN is provided in the PC; and
(2) the value of Owner PIN is not provided in the PC, and Owner PIN is calculated on the end user side.

(1) Value of Owner PIN is Provided in PC

The PC vendor stores SID in an area which cannot be easily viewed (read) by an end user, such as BIOS, and ships the storage device to the end user. As the storage device is shipped to the end user in the inactive state, the lock function is disabled in the initial state. When the end user enables the lock function, SID stored in the area which cannot be easily viewed by the end user is read by the program stored in the BIOS, etc. The storage device is caused to transition from the inactive state to the active state by Activate command.

(2) Value of Owner PIN is not Provided in PC

The PC vendor generates SID with the label information of SID, the serial number of the storage device, etc., in advance, and sets the value of SID in the storage device. It is assumed that only the PC vendor could know this generation algorithm including parameters. The label information refers to the ID of SID. The value of SID (for example, XXX, YYY, ZZZ) corresponds to the label information (for example, 0001, 0002, 0003). The value of SID is not distributed to the end user. However, the label information is distributed to the end user.

The label information of the SID is stored in an area which cannot be easily set by the end user of the storage device (in other words, an area to which the end user cannot easily write data). The program stored in the BIOS, etc., on the end user side generates SID, using the label information, the serial number of the storage device, etc. The end user causes the storage device to transition from the inactive state to the active state by Activate command with SID. When the PC is connected to the Internet, the PC may communicate with the server of the PC vendor, and the label information of SID and the serial number of the storage device may be transferred to the server of the PC vendor from the PC. The PC vendor may generate SID based on the received information. In this way, the authorization of Owner PIN can be performed without providing Owner PIN on the end user side.

Alternatively, the PC vendor may store the combination of the value of SID (for example, XXX, YYY, ZZZ) and the label information (for example, 0001, 0002, 0003) in a table. The value of SID (for example, XXX) is set in an SID storage area which cannot be easily viewed by the end user of the storage device and cannot be set by the end user. The PC notifies the server of the PC vendor of the label information of SID, in other words, which SID is set. Thus, it is preferable that the label information not be changed by the end user without authorization. The PC vendor is capable of obtaining SID from the label information with reference to the above table. The PC vendor is capable of authorizing Owner PIN by transmitting the obtained SID to the program of the PC via a network without providing Owner PIN on the end user side.

In either case, the storage device needs to secure an area for storing the label information of SID. This area should be preferably defined in an area other than the LBA area to prevent the end user from accessing the area by a normal read/write command. Further, the authority to write data needs to be limited to SID such that the label information of SID cannot be changed by the end user without authorization. FIG. 22 shows the configuration of a storage device 12E according to the present embodiment. The storage device 12E further includes a label store manager 150. The label store manager 150 sets the label information of SID in a label store table 152 and views the label information from the label store table 152. The label store table 152 is accessed by Set command and Get command instead of a read/write command for an LBA. The label store manager 150 sets a value in the label store table 152 by Set command, and obtains the set value from the label store table 152 by Get command. FIG. 22 shows the storage device 125 wherein the label store manager 150 is provided in the storage device 12 of the first embodiment. However, the storage device 125 may be structured such that the label store manager 150 is provided in the storage device 12A, 12B, 12C or 12D of the second to fifth embodiments. Further, as shown in FIG. 23, the authority to access the label store table 152 is restricted based on the user of issuance source of the command. The value of the label store table 152 can be read by any type of authority by means of Get command. However, writing to the label store table 152 by means of Set command is limited to the authority of Owner PIN (SID). For example, when Set command regarding the label store table 152 is supplied to the storage device 125, the authentication processor 102 performs user authentication process using the PIN, and the authorization processor 104 determines whether or not the user who issues Set command is the owner. When the user who issues Set command is the owner, the label information is set in the label store table 152.

In the factory of the PC vendor, SID is set. The label information of SID is stored in the label store table 152, using the authority of SID. In this structure, the authority to write the label information of SID can be limited to SID.

According to the sixth embodiment, the storage device can be caused to transition from the inactive state to the active state by Activate command on the end user side.

When the lock function is not used, a PC which is shipped out in the inactive state can be used as it is. When the end user wants to use the lock function, the lock function can be enabled by causing the storage device to transition from the inactive state to the active state by Activate command on the end user side. In the above manner, it is possible to provide an end user who uses the lock function and an end user who does not want to use the lock function with both of the functions. The usability can be improved.

The present invention is not limited to the embodiments described above, and the constituent elements can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A storage device configured to store unencrypted user data, the user data being capable of being erased according to at least one data erasure mechanism which is supported by the storage device, the storage device comprising:
    a receiver configured to receive an inquiry from a host device, the inquiry relating to the at least one data erasure mechanism which is supported by the storage device, and
a transmitter configured to transfer response information indicating the at least one data erasure mechanism which is supported by the storage device to the host device, in response to receiving the inquiry from the host device, wherein
    the response information comprises certain bits respectively indicative of whether or not certain data erasure mechanisms are supported by the storage device, and
    the certain data erasure mechanisms comprises the at least one data erasure mechanism which is supported by the storage device.

2. The storage device of claim 1, wherein the receiver is configured to receive the inquiry when the host device is turned on or booted.

3. The storage device of claim 1, further comprising:
a first processor configured to
    determine, when specification information specifying an data erasure mechanism is transferred to the receiver from the host device after the transmitter transfers the response information to the host device, whether the host device has authority to issue the specification information, and
    cause the receiver to receive the specification information when the first processor determines that the host device has the authority to issue the specification information.

4. The storage device of claim 3, further comprising:
a second processor configured to
    determine, when the receiver receives a data erase command from the host device, whether the host device has authority to issue the data erase command and
    erase the user data according to the data erasure mechanism specified by the specification information when the second processor determines that the host device has the authority to issue the data erase command.

5. The storage device of claim 4, further comprising:
a third processor is further configured to set personal identification information and initialize the personal identification information wherein the personal identification information comprises at least a first identification information relating to a first person and a second identification information relating to a second person, wherein
the data erase command comprises a command to initialize the value of the personal identification information,
the data erase command comprises a first data erase command relating to a first data and the first person and a second data erase command relating to a second data and the second person, and
authority to issue the first data erase command is different from authority to issue the second data erase command.

6. The storage device of claim 1, further comprising:
a third processor configured to
    determine, when the receiver receives specification information specifying a data erasure mechanism from the host device after the transmitter transfers the response information to the host device, whether the data erasure mechanism specified by the specification information differs from the at least one data erasure mechanism, and
    transfer an error signal to the host system when the third processor determines that the data erasure mechanism specified by the specification information differs from the at least one data erasure mechanism.

7. The storage device of claim 1, wherein the at least one data erasure mechanism comprises an overwrite erasure mechanism, a block erasure mechanism, or an unmap.

8. A storage device comprising:
a storage area including namespaces, at least one of the namespaces including ranges having different access authorities to unlock the range wherein the data in the range can be erased when the range is unlocked;
a storage processor configured to manage relationship information indicating a relationship between each of the namespaces and ranges included in the each of the namespaces;
a receiver configured to receive a namespace erase command from a host device; and
a first processor configured to specify a first namespace corresponding to the namespace erase command received by the receiver, specify one or more ranges included in the first namespace based on the relationship information stored in the storage area, and erase data of the one or more ranges included in the first namespace.

9. The storage device of claim 8, wherein the namespace erase command comprises a command for erasing a single namespace or all the namespaces.

10. The storage device of claim 8, wherein the receiver is configured to further receive a first command for a first range in the ranges from the host device; and
the first processor is further configured to erase data in the first range in response to the first command when authority to access the first range is authenticated.

11. A storage device operable in a first state or a second state, wherein
in the first state, when a command is received from a host device, the storage device is configured to transfer a response based on the command to the host device,
in the second state, when a first command is received from the host device, the storage device transfers information indicating that the storage device operates in the second state to the host device, and when a command other than the first command is received from the host device, the storage device transfers information indicating an error to the host device in the first state, personal identification information is set, in the second state, data is invalidated, and the personal identification information set in the first state is initialized, the storage device is configured to transition from the first state to the second state, and the storage device is not configured to transition from the second state to the first state.

12. The storage device of claim 11, further comprising:
a first processor configured to encrypt data stored in the storage device and decrypt the encrypted data stored in the storage device; and
a second processor configured to disable at least a decrypting function of the first processor when the storage device operates in the second state.

13. A storage device configured to operate in an inactive state or an active state, wherein a lock function is disabled and data can be erased in the inactive state and the lock function is enabled in the active state, the storage device comprising:
a storage module configured to store label information for obtaining or generating owner identification information, wherein no restriction is applied to read the label information from the storage module, and authority to write the label information to the storage module is limited to a user who knows the owner identification information wherein a transit from the inactive state to the active state is done in response to a first command when the owner identification information is authenticated.

14. The storage device of claim 13, wherein
a transit from the active state to the inactive state is done in response to a second command when the owner identification information is authenticated.

* * * * *